US011893949B2

(12) United States Patent
Sasaki et al.

(10) Patent No.: US 11,893,949 B2
(45) Date of Patent: Feb. 6, 2024

(54) DISPLAY DEVICE USING PIXEL CIRCUIT HAVING MEMORY FUNCTION, AND DRIVING METHOD THEREOF

(71) Applicant: Sharp Display Technology Corporation, Kameyama (JP)

(72) Inventors: Yasushi Sasaki, Kameyama (JP); Yuhichiroh Murakami, Kameyama (JP); Shuji Nishi, Kameyama (JP); Takahiro Yamaguchi, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/144,063

(22) Filed: May 5, 2023

(65) Prior Publication Data

US 2023/0386424 A1 Nov. 30, 2023

(30) Foreign Application Priority Data

May 31, 2022 (JP) ................................ 2022-088633

(51) Int. Cl.
*G09G 3/36* (2006.01)

(52) U.S. Cl.
CPC ......... *G09G 3/3629* (2013.01); *G09G 3/3614* (2013.01); *G09G 3/3677* (2013.01); *G09G 3/3688* (2013.01); *G09G 2300/0842* (2013.01); *G09G 2310/0278* (2013.01); *G09G 2310/0291* (2013.01); *G09G 2330/021* (2013.01)

(58) Field of Classification Search
CPC ..... G09G 2300/0857; G09G 2320/043; G09G 2330/021
See application file for complete search history.

(56) References Cited

U.S. PATENT DOCUMENTS 8,605,032 B2 * 12/2013 Liu ........................ G09G 3/344 345/107
8,749,477 B2 * 6/2014 Miyazaki ............. G09G 3/3446 359/228
8,884,996 B2 * 11/2014 Teranishi ............. G09G 3/2074 345/89
9,400,382 B2 * 7/2016 Lewis .................... G09G 3/346
2009/0128585 A1 5/2009 Shimodaira
2009/0195566 A1 * 8/2009 Miyazaki ............. G09G 3/3446 345/76

FOREIGN PATENT DOCUMENTS

JP 2009-145859 A 7/2009

* cited by examiner

*Primary Examiner* — Van N Chow
(74) *Attorney, Agent, or Firm* — ScienBiziP, P.C.

(57) ABSTRACT

When binary pixel data is written to a pixel circuit, of an H-level (3V) and a L-level (0V), a voltage of the level indicating the binary pixel data is held at a first node, and a voltage of the inverted level thereof is held at a second node. The first and second nodes are connected to a third node via N-channel transistors, respectively, and first and second selection control signals are supplied to gate terminals of the transistors, respectively. Voltage levels of the first and second selection control signals are periodically switched between 5V indicating the H-level and 0V indicating the L-level in a mutually inverted manner. As a result, the voltage of the first node and the voltage of the second node are alternately selected and applied to a pixel electrode of a display element.

16 Claims, 16 Drawing Sheets

DISPLAY DEVICE USING PIXEL CIRCUIT HAVING MEMORY FUNCTION, AND DRIVING METHOD THEREOF

CROSS-REFERENCE TO RELATED APPLICATIONS

This application claims the benefit of priority to Japanese Patent Application Number 2022-088633 filed on May 31, 2022. The entire contents of the above-identified application are hereby incorporated by reference.

BACKGROUND

Technical Field

The following disclosure relates to an AC-driven display device using a pixel circuit having a memory function.

In recent years, in order to reduce power consumption, a display device has been developed that has a memory function realized by including a bistable circuit in a pixel circuit. In such a display device (hereinafter referred to as a "pixel memory-type display device"), one bit of data can be held for each pixel, and when an image of the same content or an image with little change is displayed for a long period of time, image display is performed by using data held in a bistable circuit (hereinafter also referred to as a "pixel memory circuit") in each of pixel circuits. In the pixel memory-type display device, once the data is written to the pixel memory circuit, the data written to the pixel memory circuit is held until rewritten. Thus, little power is consumed in periods other than the periods before and after the content of the image changes.

In relation to the display device disclosed in the present application, JP 2009-145859 A describes an electrophoretic display device using a pixel circuit including a latch circuit corresponding to the above-described pixel memory circuit. In addition to the latch circuit, the pixel circuit in this display device includes a switch circuit for selecting, from two types of signals, a signal to be applied to a pixel electrode of a display element in accordance with binary data held in the latch circuit. This switch circuit includes two transmission gates, and each of the transmission gates is constituted by a P-channel transistor and an N-channel transistor. These two transmission gates are controlled to be switched between an ON state and an OFF state in a mutually inverted manner in accordance with the binary data held in the latch circuit. As a result, the signal corresponding to the held binary data, among the above-described two types of signals, is applied to the pixel electrode.

SUMMARY

In order to realize an AC-driven display device that, using this type of pixel circuit having a memory function as described above, periodically inverts the polarity of a voltage to be applied to a display element, such as in a liquid crystal display device, it is necessary to provide, in the pixel circuit and in addition to the pixel memory circuit, a circuit for applying a voltage corresponding to data held in the pixel memory circuit to the display element while switching the polarity of the voltage. Thus, the circuit scale of the pixel circuit becomes large. Therefore, a configuration including such a pixel memory circuit as described above has not been able to be employed in a high-resolution AC-driven display device.

Thus, there is a demand to reduce the circuitry amount of a pixel circuit in an AC-driven pixel memory-type display device in order to enable the AC-driven pixel memory-type display device to realize high-resolution display.

(1) A display device according to some embodiments of the disclosure is a display device that performs binary display using a pixel circuit having a memory function, the display device including a plurality of pixel circuits configured to form an image to be displayed, a first power source line and a second power source line, a first selection control line and a second selection control line, and a selection control circuit configured to generate a first selection control signal and a second selection control signal to be applied to the first selection control line and the second selection control line, respectively, in which each of the plurality of pixel circuits includes a display element including a pixel electrode and configured to be driven by a voltage for which a polarity is periodically inverted, a pixel memory circuit including a first node and a second node, the first node being configured to hold one of a voltage of the first power source line and a voltage of the second power source line in accordance with a pixel corresponding to the pixel circuit of the image to be displayed, and the second node being configured to hold, of the voltage of the first power source line and the voltage of the second power source line, the voltage that is different from the voltage held at the first node, and a voltage selection circuit configured to select a voltage to be applied to the pixel electrode from the voltage of the first node and the voltage of the second node, the voltage selection circuit includes a first selection transistor, as a switching element, including a first conduction terminal connected to the first node, a second conduction terminal connected to the pixel electrode, and a control terminal connected to the first selection control line, and a second selection transistor, as a switching element, including a first conduction terminal connected to the second node, a second conduction terminal connected to the pixel electrode, and a control terminal connected to the second selection control line, and the selection control circuit generates the first selection control signal and the second selection control signal to cause the first selection transistor and the second selection transistor to be turned on and off periodically in a mutually inverted manner.

(2) In addition, a display device according to some embodiments of the disclosure includes the configuration of (1) described above, in which in each of the plurality of pixel circuits, the selection control circuit generates the first selection control signal and the second selection control signal to cause a voltage turning on the first selection transistor to be applied to the first selection control line in order for the voltage of the first node to be supplied to the pixel electrode without being affected by a threshold voltage of the first selection transistor, when the voltage of the first node is selected by the voltage selection circuit, and generates the first selection control signal and the second selection control signal to cause a voltage turning on the second selection transistor to be applied to the second selection control line in order for the voltage of the second node to be supplied to the pixel electrode without being affected by a threshold voltage of the second selection transistor, when the voltage of the second node is selected by the voltage selection circuit.

(3) In addition, a display device according to some embodiments of the disclosure includes the configuration of (2) described above, in which the first selection transistor and the second selection transistor are N-channel transistors, and the selection control circuit generates the first selection control signal and the second selection control signal to cause a voltage of the first selection control line to be higher, by at least the threshold voltage of the first selection transistor, than a higher voltage of the voltage of the first power source line and the voltage of the second power source line, when the first selection transistor is to be turned on, and generates the first selection control signal and the second selection control signal to cause a voltage of the second selection control line to be higher than the higher voltage by at least the threshold voltage of the second selection transistor, when the second selection transistor is to be turned on.

(4) In addition, a display device according to some embodiments of the disclosure includes the configuration of (2) described above, in which the first selection transistor and the second selection transistor are P-channel transistors, and the selection control circuit generates the first selection control signal and the second selection control signal to cause a voltage of the first selection control line to be lower, by at least an absolute value of the threshold voltage of the first selection transistor, than a lower voltage of the voltage of the first power source line and the voltage of the second power source line, when the first selection transistor is to be turned on, and generates the first selection control signal and the second selection control signal to cause a voltage of the second selection control line to be lower than the lower voltage by at least an absolute value of the threshold voltage of the second selection transistor, when the second selection transistor is to be turned on.

(5) In addition, a display device according to some embodiments of the disclosure includes any one of the configurations of (1) to (4) described above, in which the selection control circuit generates the first selection control signal and the second selection control signal to cause the first selection transistor to change from an OFF state to an ON state when the second selection transistor is in the OFF state, and cause the second selection transistor to change from the OFF state to the ON state when the first selection transistor is in the OFF state.

(6) In addition, a display device according to some embodiments of the disclosure includes any one of the configurations of (1) to (5) described above, and further includes a plurality of data signal lines, a plurality of scanning signal lines, a data signal line drive circuit configured to apply a plurality of data signals representing the image to be displayed to the plurality of data signal lines, and a scanning signal line drive circuit configured to selectively drive the plurality of scanning signal lines, in which each of the plurality of pixel circuits corresponds to one of the plurality of data signal lines and corresponds to one of the plurality of scanning signal lines, and in each of the plurality of pixel circuits, of the voltage of the first power source line and the voltage of the second power source line, the pixel memory circuit holds, at the first node, a voltage corresponding to a voltage of a corresponding data signal line when a corresponding scanning signal line is selected, and holds, at the second node, the voltage, of the voltage of the first power source line and the voltage of the second power source line, that is different from the voltage held at the first node.

(7) In addition, a display device according to some embodiments of the disclosure includes the configuration of (6) described above, in which the data signal line drive circuit and the scanning signal line drive circuit stop operating in a period in which a voltage level of one or both of the first selection control signal and the second selection control signal is switched.

(8) In addition, a display device according to some embodiments of the disclosure includes the configuration of (6) described above, and further includes a first power source circuit configured to generate a power source voltage to be supplied to the data signal line drive circuit and the scanning signal line drive circuit, and a second power source circuit provided as a separate power source circuit from the first power source circuit, and configured to generate a power source voltage to be supplied to the plurality of pixel circuits.

(9) In addition, a display device according to some embodiments of the disclosure includes the configuration of (6) described above, and further includes a power source circuit configured to generate a power source voltage to be supplied to the data signal line drive circuit, the scanning signal line drive circuit, and the plurality of pixel circuits, and a power supply line configured to supply the power source voltage generated by the power source circuit to the data signal line drive circuit, the scanning signal line drive circuit, and the plurality of pixel circuits, in which the power supply line branches, in a vicinity of the power source circuit, into a power source line configured to supply the power source voltage to the data signal line drive circuit and the scanning signal line drive circuit, and a power source line configured to supply the power source voltage to the plurality of pixel circuits.

(10) In addition, a display device according to some embodiments of the disclosure includes any one of the configurations of (6) to (9) described above, in which each of the plurality of pixel circuits further includes a first conduction terminal connected to the corresponding data signal line, a second conduction terminal connected to the first node, and a write control transistor, as a switching element, including a control terminal connected to the corresponding scanning signal line.

(11) In addition, a display device according to some embodiments of the disclosure includes any one of the configurations of (1) to (10) described above, in which the first power source line is a high voltage side power source line, the second power source line is a low voltage side power source line, and the pixel memory circuit includes a first P-channel transistor including a source terminal connected to the first power source line, a drain terminal connected to the second node, and a gate terminal connected to the first node, a first N-channel transistor including a source terminal connected to the second power source line, a drain terminal connected to the second node, and a gate terminal connected to the first node, a second P-channel transistor including a source terminal connected to the first power source line, a drain terminal connected to the first node, and a gate terminal connected to the second node, and a second N-channel transistor including a source terminal connected to the second power source line, a drain terminal connected to the first node, and a gate terminal connected to the second node.

(12) In addition, a display device according to some embodiments of the disclosure includes the configuration of (1) described above, and further includes a level shift portion, in which the selection control circuit generates the first selection control signal and the second selection control signal based on the voltage of the first power source line and the voltage of the second power source line, in each of the plurality of pixel circuits, the level shift portion converts a voltage level of the first selection control signal to cause a voltage turning on the first selection transistor to be applied to the first selection control line in order for the voltage of the first node to be supplied to the pixel electrode without being affected by a threshold voltage of the first selection transistor, when the voltage of the first node is selected by the voltage selection circuit, and the level shift portion converts a voltage level of the second selection control signal to cause a voltage turning on the second selection transistor to be applied to the second selection control line in order for the voltage of the second node to be supplied to the pixel electrode without being affected by a threshold voltage of the second selection transistor, when the voltage of the second node is selected by the voltage selection circuit, and the first selection control signal and the second selection control signal having had the voltage level converted by the level shift portion are applied to the first selection control line and the second selection control line, respectively.

(13) In addition, a display device according to some embodiments of the disclosure includes the configuration of (12) described above, and further includes a buffer portion including a plurality of buffers configured to sequentially delay the first selection control signal and the second selection control signal having had the voltage level converted by the level shift portion, in which the first selection control line and the second selection control line are configured to supply, to the plurality of pixel circuits and in a dispersed manner, the first selection control signal and the second selection control signal having been sequentially delayed by the buffer portion.

(14) In addition, a display device according to some embodiments of the disclosure includes any one of the configurations of (1) to (13) described above, and further includes a common electrode drive circuit, in which the display element further includes a common electrode provided in common to the plurality of pixel circuits, and the common electrode drive circuit is configured to drive the common electrode to cause a polarity of a voltage applied between the pixel electrode and the common electrode to be periodically inverted in each of the plurality of pixel circuits.

(15) In addition, a display device according to some embodiments of the disclosure includes the configuration of (14) described above, in which the display element is a liquid crystal display element including a liquid crystal interposed between the pixel electrode and the common electrode.

(16) In addition, a driving method of a display device according to some of other embodiments of the disclosure is a driving method of a display device that performs binary display using a pixel circuit having a memory function, the display device including a plurality of pixel circuits configured to form an image to be displayed, a first power source line and a second power source line, and a first selection control line and a second selection control line, each of the plurality of pixel circuits including a display element including a pixel electrode and configured to be driven by a voltage for which a polarity is periodically inverted, a pixel memory circuit including a first node and a second node, the first node being configured to hold one of a voltage of the first power source line and a voltage of the second power source line in accordance with a pixel corresponding to the pixel circuit of the image to be displayed, and the second node being configured to hold, of the voltage of the first power source line and the voltage of the second power source line, the voltage that is different from the voltage held at the first node, and a voltage selection circuit configured to select a voltage to be applied to the pixel electrode from the voltage of the first node and the voltage of the second node, the voltage selection circuit including a first selection transistor, as a switching element, including a first conduction terminal connected to the first node, a second conduction terminal connected to the pixel electrode, and a control terminal connected to the first selection control line, and a second selection transistor, as a switching element, including a first conduction terminal connected to the second node, a second conduction terminal connected to the pixel electrode, and a control terminal connected to the second selection control line, the driving method including holding, in the pixel memory circuit in each of the plurality of pixel circuits, one of the voltage of the first power source line and the voltage of the second power source line at the first node in accordance with the pixel corresponding to the pixel circuit of the image to be displayed, and holding, at the second node, the voltage, of the voltage of the first power source line and the voltage of the second power source line, that is different from the voltage at the first node, and alternately selecting, in the voltage selection circuit in each of the plurality of pixel circuits, the voltage to be applied to the pixel electrode in the pixel circuit from the voltage of the first node and the voltage of the second node by periodically turning on and off the first selection transistor and the second selection transistor in a mutually inverted manner using a voltage of the first selection control line and a voltage of the second selection control line, in which the alternately selecting of the voltage includes applying, when the voltage of the first node is selected, a voltage turning on the first selection transistor to the first selection control line to cause the voltage of the first node to be applied to the pixel electrode without being affected by a threshold voltage of the first selection transistor and applying, when the voltage of the second node is selected, a voltage turning on the second selection transistor to the second selection control line to cause the voltage of the second node to be applied to the pixel electrode without being affected by a threshold voltage of the second selection transistor.

According to some embodiments of the disclosure, in the pixel memory circuit in each of the pixel circuits, one of the voltage of the first power source line and the voltage of the second power source line is held at the first node in accordance with the pixel corresponding to the pixel circuit of the image to be displayed, and the voltage, of the voltage of the first power source line and the voltage of the second power source line, that is different from the voltage held at the first node is held at the second node. In each of the pixel circuits, the first node is connected to the pixel electrode of the display element via the first selection transistor, the second node is connected to the pixel electrode of the display element via the second selection transistor, the first selection control line is connected to the control terminal of the first selection transistor, and the second selection control line is connected to the control terminal of the second selection transistor. The first and second selection transistors are periodically turned on and off in the mutually inverted manner by the first and second selection control signals applied to the first and second selection control lines. As a result, the voltage of the first node and the voltage of the second node are alternately applied to the pixel electrode, and the display element is AC-driven (inversion-driven) without rewriting the data voltage in the pixel memory circuit. Here, the first and second selection control signals are signals that are supplied in common to the plurality of pixel circuits for forming the image to be displayed, and by appropriately setting the voltage levels of the first and second selection control signals, when the voltage of the first node is selected, the voltage of the first node can be applied to the pixel electrode without being affected by the threshold voltage of the first selection transistor, and when the voltage of the second node is selected, the voltage of the second node can be applied to the pixel electrode without being affected by the threshold voltage of the second selection transistor. Therefore, a voltage selection circuit that operates appropriately can be realized with two transistors, and the circuitry amount of the pixel circuit can be reduced compared with a known pixel memory-type display device that uses a voltage selection circuit including four transistors constituting two CMOS analog switches. Thus, according to the present embodiment, display of a high-resolution image, which has not been able to be realized by a known AC-driven pixel memory-type display device, becomes possible.

BRIEF DESCRIPTION OF DRAWINGS

The disclosure will be described with reference to the accompanying drawings, wherein like numbers reference like elements.

DESCRIPTION OF EMBODIMENTS

Each of embodiments will be described below with reference to the drawings. Note that in each of transistors to be referred to below, a gate terminal corresponds to a control terminal, one of a drain terminal and a source terminal corresponds to a first conduction terminal, and the other of the drain terminal and the source terminal corresponds to a second conduction terminal. In addition, the transistors in the following embodiments are, for example, thin film transistors, but the disclosure is not limited to this example. Furthermore, "connection" in the present description means "electrical connection" unless otherwise specified, and without departing from the subject matter of the disclosure, the "connection" means not only direct connection, but also indirect connection via another element.

1. First Embodiment

1.1 Overall Configuration and Operation Outline

Figure 1:
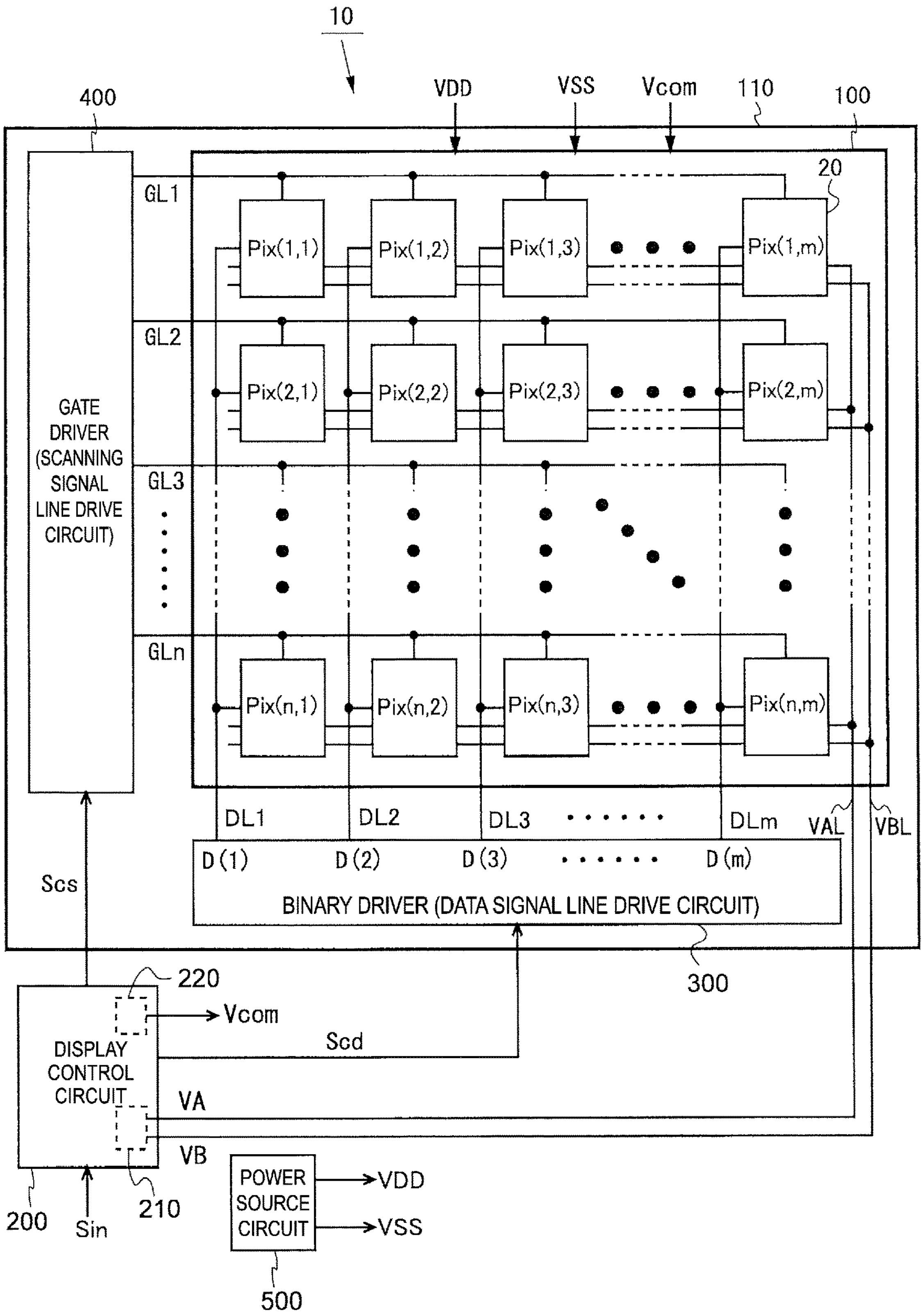
FIG. 1 is a block diagram illustrating a configuration of a pixel memory-type display device according to a first embodiment.
Figure 2:
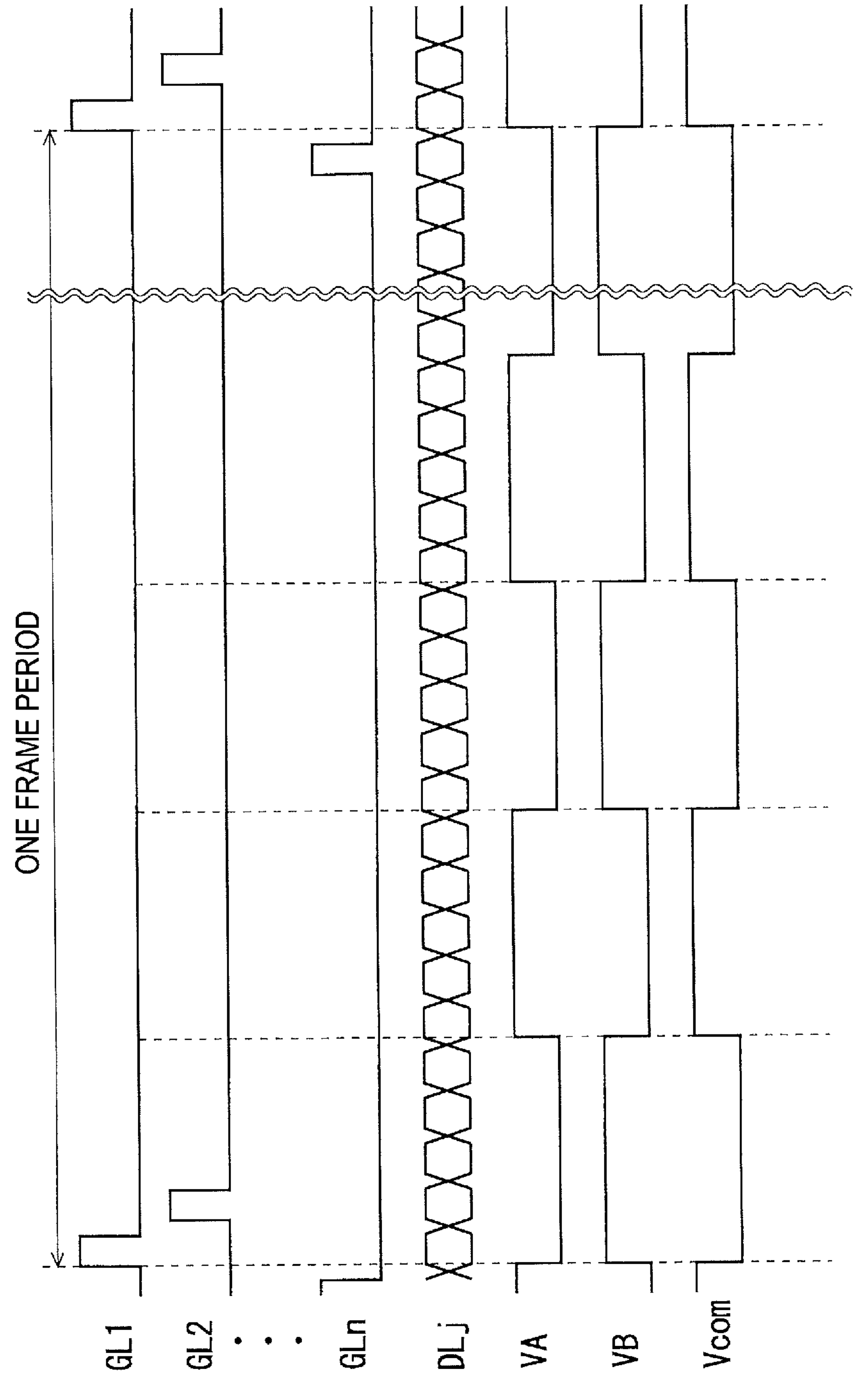
FIG. 2 is a timing chart for describing driving of the pixel memory-type display device according to the first embodiment.

FIG. 1 is a block diagram illustrating an overall configuration of a pixel memory-type display device 10 according to a first embodiment. FIG. 2 is a timing chart for describing driving of the pixel memory-type display device 10. The overall configuration and an operation outline of the pixel memory-type display device 10 will be described below with reference to FIGS. 1 and 2.

As illustrated in FIG. 1, the pixel memory-type display device 10 includes a display panel 110, a display control circuit 200, and a power source circuit 500, and the display panel 110 includes a display portion 100, a binary driver 300 as a data signal line drive circuit, and a gate driver 400 as a scanning signal line drive circuit. The power source circuit 500 generates a high voltage side power source voltage VDD and a low voltage side power source voltage VSS to be supplied to the display portion 100, the display control circuit 200, the binary driver 300, and the gate driver 400.

The display portion 100 is provided with m (m is an integer of 2 or more) data signal lines DL1 to DLm and n (n is an integer of 2 or more) scanning signal lines GL1 to GLn intersecting the data signal lines DL1 to DLm, and m×n pixel circuits Pix(i,j) are arranged in a matrix shape along the m data signal lines DL1 to DLm and the n scanning signal lines GL1 to GLn (i=1 to n, j=1 to m). These m×n pixel circuits Pix(i,j) (i=1 to n, j=1 to m) form an image to be displayed based on an input signal Sin described later. Each of the pixel circuits Pix(i,j) corresponds to one of the m data signal lines DL1 to DLm, and corresponds to one of the n scanning signal lines GL1 to GLn. Here, the "pixel circuit Pix(i,j)" is a pixel circuit corresponding to the i-th scanning signal line GLi and the j-th data signal line DLj, and is also referred to as a "pixel circuit of the i-th row and the j-th column". In the following description, when the pixel circuits Pix(1,1) to Pix(n,m) are not distinguished from each other, each of the pixel circuits Pix(i,j) (i=1 to n, j=1 to m) may be denoted by a reference sign "20".

In addition, in the display portion 100, power source lines (not illustrated) common to all the pixel circuits Pix(1,1) to Pix(n,m) are provided. Specifically, a first power source line (hereinafter referred to as a "high voltage side power source line" and denoted by the same reference sign "VDD" as that of the high voltage side power source voltage) for supplying the high voltage side power source voltage VDD, and a second power source line (hereinafter referred to as a "low voltage side power source line" and denoted by the same reference sign "VSS" as that of the low voltage side power source voltage) for supplying the low voltage side power source voltage VSS, are provided. Furthermore, the display portion 100 is provided with signal lines for supplying signals for applying a voltage (either a white voltage or a black voltage in the present embodiment) corresponding to a display gray scale to a liquid crystal display element as a display element in each of the pixel circuits Pix(i,j) while periodically inverting the polarity of the voltage. Specifically, as signals for periodically switching a voltage applied to a pixel electrode in each of the pixel circuits Pix(i,j) in order to perform binary display in each of the pixel circuits Pix(i,j) by driving the liquid crystal display element using an alternating current, a first selection control signal VA and a second selection control signal VB, which change in a mutually inverted manner as illustrated in FIG. 2, are generated as described later, and a first selection control line VAL and a second selection control line VBL for supplying the first selection control signal VA and the second selection control signal VB to each of the pixel circuits Pix(i,j) are arranged as illustrated in FIG. 1.

The display control circuit 200 receives, from outside of the display device 10, the input signal Sin including image information representing the image to be displayed and timing control information for image display, generates a data side control signal Scd and a scanning side control signal Scs based on the input signal Sin, and outputs the data side control signal Scd and the scanning side control signal Scs to the binary driver 300 and the gate driver 400, respectively. As a result, the display control circuit 200 controls the binary driver 300 and the gate driver 400. In addition, the display control circuit 200 includes a selection control circuit 210 as illustrated in FIG. 2 that generates the first selection control signal VA and the second selection control signal VB, and a common electrode drive circuit 220 as illustrated in FIG. 2 that generates a common voltage signal Vcom, and the display control circuit 200 also functions as a selection control circuit and a common electrode drive circuit. The same applies to other embodiments described later (see FIGS. 11 to 13, FIGS. 15 and 16). The first selection control signal VA and the second selection control signal VB generated by the selection control circuit 210 are applied to the first selection control line VAL and the second selection control line VBL, respectively, and are supplied to each of the pixel circuits Pix(i,j) via the first selection control line VAL and the second selection control line VBL (i=1 to n, j=1 to m). The common voltage signal Vcom generated by the common electrode drive circuit 220 is applied to a common electrode 25 provided in the display portion 100. The common electrode 25 will be described later. Note that, although the selection control circuit 210 and the common electrode drive circuit 220 are included in the display control circuit 200 in the configuration illustrated in FIG. 1, one or both of the selection control circuit 210 and the common electrode drive circuit 220 may be separated from the display control circuit 200 and may be provided outside the display control circuit 200. The same applies to the other embodiments described later.

The binary driver 300, as the data signal line drive circuit, drives the data signal lines DL1 to DLm based on the data side control signal Scd from the display control circuit 200. Specifically, the binary driver 300 outputs in parallel m data signals D(1) to D(m) representing the image to be displayed, and applies the data signals D(1) to D(m) to the data signal lines DL1 to DLm, respectively, based on the data side control signal Scd. Note that, in the present embodiment, since the image to be displayed is a binary image, the binary driver 300 generates each of data signals D(j) as a binary signal for which the voltage level can be switched for each horizontal period as illustrated in FIG. 2, and applies either a white voltage or a black voltage to each of data signal lines DLj as the data signal D(j) (j=1 to m).

The gate driver 400, as the scanning signal line drive circuit, drives the scanning signal lines GL1 to GLn based on the scanning side control signal Scs from the display control circuit 200. More specifically, the gate driver 400 sequentially selects the scanning signal lines GL1 to GLm in each frame period for a predetermined time period each time based on the scanning side control signal Scs, as illustrated in FIG. 2, and applies an active signal (high-level voltage) to a selected scanning signal line GLk, and a non-active signal (low-level voltage) to unselected scanning signal lines. With this, m pixel circuits Pix(k,1) to Pix(k,m) corresponding to the selected scanning signal line GLk (1≤k≤n) are collectively selected. As a result, in a selection period of the scanning signal line GLk (hereinafter referred to as a "k-th scanning selection period"), the voltages of the m data signals D(1) to D(m) applied to the data signal lines DL1 to DLm from the binary driver 300 (hereinafter these voltages are simply also referred to as "data voltages" without distinguishing them from each other) are written to the pixel circuits Pix(k,1) to Pix(k,m), respectively, as binary pixel data.

As described above, the data signals D(1) to D(m) are applied to the data signal lines DL1 to DLm, respectively, the scanning signals G(1) to G(n) are applied to the scanning signal lines GL1 to GLn, respectively, the common voltage signal Vcom is applied to the common electrode 25, the first selection control signal VA and the second selection control signal VB are supplied to each of the pixel circuits Pix(i,j) via the first selection control line VAL and the second selection control line VBL, respectively, and further, light is irradiated onto the back face of the display portion 100 from a backlight (not illustrated). As a result, an image represented by the input signal Sin from the outside is displayed on the display portion 100.

1.2. Configuration and Operation of Pixel Circuit 1.2.1 Configuration and Operation of Pixel Circuit as Comparative Example FIG. 3 is a circuit diagram illustrating a configuration of a pixel circuit 20*a* as a comparative example that can be used in a display device having an overall configuration similar to that of the display device 10 illustrated in FIG. 1, more specifically, illustrating a configuration of the pixel circuit Pix(i,j) of the i-th row and the j-th column as a comparative example (see JP 2009-145859 A).

Figure 3:
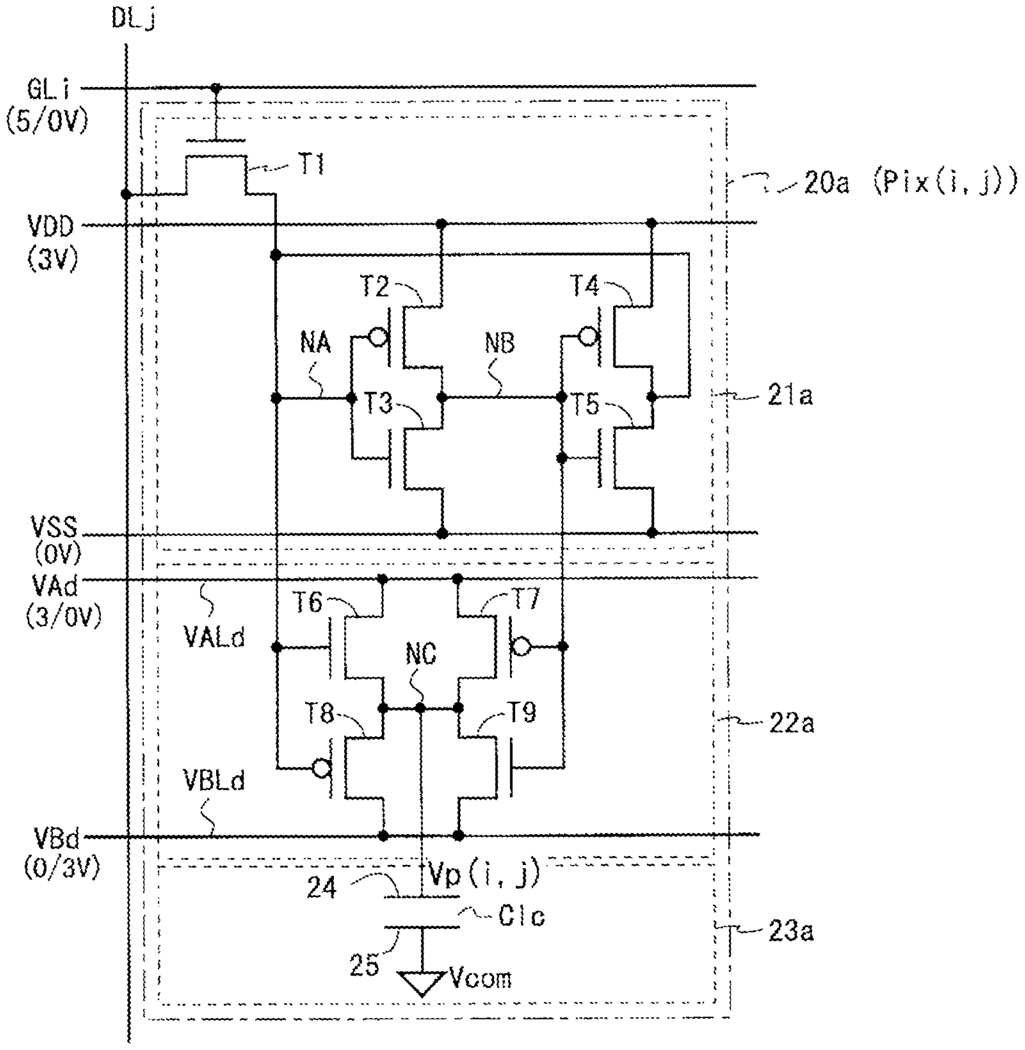
FIG. 3 is a circuit diagram illustrating a configuration of a pixel circuit as a comparative example that can be used in a liquid crystal display device as a pixel memory-type display device.

As illustrated in FIG. 3, this pixel circuit Pix(i,j) is connected to a scanning signal line corresponding to the pixel circuit (hereinafter referred to as a "corresponding scanning signal line" when focusing on the pixel circuit) GLi, a data signal line corresponding to the pixel circuit (hereinafter referred to as a "corresponding data signal line" when focusing on the pixel circuit) DLj, a first AC drive signal line VALd, a second AC drive signal line VBLd, the high voltage side power source line VDD, and the low voltage side power source line VSS, and this pixel circuit Pix(i,j) includes a pixel memory circuit 21*a*, a voltage selection circuit 22*a*, and a display element 23*a*. Note that the first AC drive signal line VALd and the second AC drive signal line VBLd correspond to the first selection control line VAL and the second selection control line VBL, respectively, in the present embodiment, but as will be described later, signals applied to the first AC drive signal line VALd and the second AC drive signal line VBLd are different from the first selection control signal VA and the second selection control signal VB in the present embodiment.

The pixel memory circuit 21*a* in the pixel circuit 20*a* (Pix(i,j)) illustrated in FIG. 3 has an N-channel write control transistor T1 functioning as a switching element, and P-channel transistors T2, T4 and N-channel transistors T3, T5 constituting a CMOS latch circuit as a bistable circuit. The P-channel transistor T2 and the N-channel transistor T3 are connected in series to constitute a CMOS inverter, and source terminals of the transistors T2 and T3 are connected to the high voltage side power source line VDD and the low voltage side power source line VDD, respectively. The P-channel transistor T4 and the N-channel transistor T5 are also connected in series to constitute a CMOS inverter, and source terminals of the transistors T4 and T5 are connected to the high voltage side power source line VDD and the low voltage side power source line VDD, respectively. Further, gate terminals of the transistors T2, T3 and drain terminals of the transistors T4, T5 are connected to each other to constitute a first node NA, and gate terminals of the transistors T4, T5 and drain terminals of the transistors T2, T3 are connected to each other to form a second node NB. The first node NA is connected to the corresponding data signal line DLj via the write control transistor T1, and a gate terminal of the write control transistor T1 is connected to the corresponding scanning signal line GLi.

The voltage selection circuit 22*a* in the pixel circuit 20*a* (Pix(i,j)) illustrated in FIG. 3 is constituted by two CMOS analog switches, which are turned on and off in a mutually inverted manner, and includes a node (hereinafter referred to as a "third node") NC for outputting a voltage to be selected. This third node NC is connected to the pixel electrode 24 in the display element 23*a*. One of the two COS analog switches includes an N-channel transistor T6 including a first conduction terminal connected to the first AC drive signal line VALd, a control terminal (gate terminal) connected to the first node NA, and a second conduction terminal connected to the third node NC, and a P-channel transistor T7 including a first conduction terminal connected to the first AC drive signal line VALd, a control terminal (gate terminal) connected to the second node NB, and a second conduction terminal connected to the third node NC. The other of the two COS analog switches includes an N-channel transistor T8 including a first conduction terminal connected to the second AC drive signal line VBLd, a control terminal (gate terminal) connected to the first node NA, and a second conduction terminal connected to the third node NC, and a P-channel transistor T9 including a first conduction terminal connected to the second AC drive signal line VBLd, a control terminal (gate terminal) connected to the second node NB, and a second conduction terminal connected to the third node NC.

The display element 23*a* in the pixel circuits 20*a* (Pix(i,j)) illustrated in FIG. 3 is a liquid crystal display element including the pixel electrode 24 connected to the third node NC in the voltage selection circuit 22*a*, the common electrode 25 provided in common to all the pixel circuits 20*a*, and a liquid crystal interposed therebetween. A liquid crystal capacitance Clc is formed by the pixel electrode 24, the common electrode 25, and the liquid crystal, and the common voltage signal Vcom is supplied to the common electrode 25.

Figure 4:
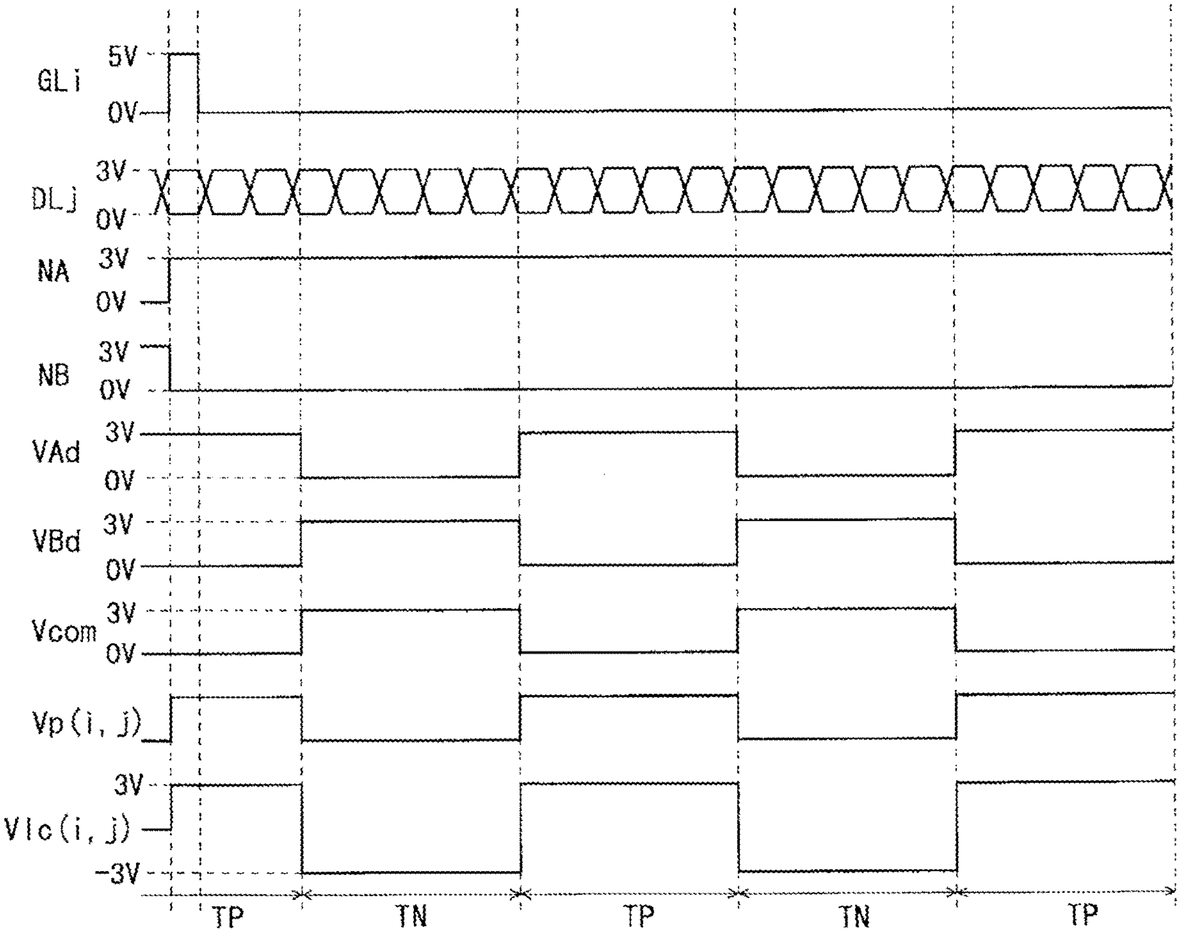
FIG. 4 is a timing chart for describing an operation of the pixel circuit as the comparative example described above.

FIG. 4 is a timing chart for describing an operation of the pixel circuit 20*a* illustrated in FIG. 3, that is, the pixel circuit Pix(i,j) of the i-th row and the j-th column as the comparative example. As illustrated in FIG. 4, among the signal lines connected to this pixel circuit Pix(i,j), the voltage of the corresponding scanning signal line GLi in a non-select state is 0V indicating a low level (L-level), and the voltage thereof in a select state is 5V indicating a high level (H-level). The voltage of the corresponding data signal line DLj at a time of white display is 3V indicating the H-level, and the voltage thereof at a time of black display is 0V indicating the L-level. Although the voltage of the first AC drive signal line VALd is the white voltage indicating the white display, the levels thereof are different between a period TP in which a positive polarity voltage is to be applied to the display element 23*a* as a liquid crystal display element, and a period TN in which a negative polarity voltage is to be applied to the display element 23*a*. Although the voltage of the second AC drive signal line VBLd is the black voltage indicating the black display, the levels thereof are different between the period TP in which the positive polarity voltage is to be applied to the display element 23*a*, and the period TN in which the negative polarity voltage is to be applied to the display element 23*a*. In addition, the voltage of the common voltage signal Vcom is at the L-level (0V) when the positive polarity voltage is applied to the display element 23*a*, and is at the H-level (3V) when the negative polarity voltage is applied to the display element 23*a*. Note that the positive and negative polarities are the polarities of the voltage of the pixel electrode 24 in reference to the voltage of the common voltage signal Vcom applied to the common electrode 25, and although it is herein assumed that the display element 23*a* is of a normally black type, the display element 23*a* may be of a normally white type (the same applies to the other embodiments).

In the pixel circuit Pix(i,j) of the i-th row and the j-th column as the comparative example illustrated in FIG. 3, when the corresponding scanning signal line GLi is in the select state, that is, when the voltage of the corresponding scanning signal line GLi is at the H-level (5V), the voltage of the corresponding data signal line DLj is applied to the first node NA via the write control transistor T1. As a result, in the pixel memory circuit 21*a*, the voltage of the first node NA is set to the same level as the voltage of the corresponding data signal line DLj, and the voltage of the second node NB is set to a level obtained by inverting the voltage level of the first node NA. In the example illustrated in FIG. 4, it is assumed that when the corresponding scanning signal line GLi is in the select state, the corresponding data signal line DLj is at the H-level (3V) indicating the white display. As a result, the first node NA is set to the H-level, and the second node NB is set to the L-level. When the corresponding scanning signal line GLi enters into the non-select state and the voltage of the corresponding scanning signal line GLi is set to the L-level (0V), the write control transistor T1 is turned off, but as illustrated in FIG. 4, the voltage of the first node NA is maintained at the H-level, that is, the level of the high voltage side power source voltage VDD (3V), and the voltage of the second node NB is maintained at the L-level, that is, the level of the low voltage side power source voltage VSS (0V). Thereafter, the voltages of the first node NA and the second node NB are maintained as they are until the corresponding scanning signal line GLi enters into the select state and a new voltage of the corresponding data signal line DLj is applied to the first node NA.

In the voltage selection circuit 22*a* in the pixel circuit Pix(i,j) illustrated in FIG. 3, when the voltage of the first node NA is at the H-level and the voltage of the second node NB is at the L-level, since the transistors T6, T7 are in the ON state and the transistors T8, T9 are in the OFF state, the first AC drive signal VAd indicating the white display is supplied to the third node NC. On the other hand, when the voltage of the first node NA is at the L-level and the voltage of the second node NB is at the H-level, since the transistors T6, T7 are in the OFF state and the transistors T8, T9 are in the ON state, the second AC drive signal VBd indicating the black display is supplied to the third node NC. Since the third node NC is connected to the pixel electrode 24, a voltage of the pixel electrode (hereinafter referred to as a "pixel voltage") Vp(i,j) is equal to the voltage of the third node NC. Since the display element 23*a* is of the normally black type as described above, as illustrated in FIG. 4, in the period (hereinafter referred to as a "positive polarity application period") TP in which the positive polarity voltage is to be applied to the display element 23*a*, the first AC drive signal VAd indicating the white display is at the H-level (3V), the second AC drive signal VBd indicating the black display is at the L-level (0V), and the common voltage signal Vcom is at the L-level (0V). On the other hand, in the period (hereinafter referred to as a "negative polarity application period") TN in which the negative polarity voltage is to be applied to the display element 23*a*, the first AC drive signal VAd indicating the white display is at the L-level (0V), the second AC drive signal VBd indicating the black display is at the L-level (3V), and the common voltage signal Vcom is at the H-level (3V).

In the example illustrated in FIG. 4, since the H-level voltage (3V) indicating the white display is supplied from the corresponding data signal line DLj to the first node NA and held thereat, and the L-level voltage (0V) is held at the second node NB, the first AC drive signal VAd indicating the white display is supplied to the pixel electrode 24 via the third node NC of the voltage selection circuit 22*a*. Thus, as illustrated in FIG. 4, in the positive polarity application period TP, the pixel voltage Vp(i,j) is at the H-level (3V) and an applied voltage Vlc(i,j) applied to the display element 23*a*, as the liquid crystal display element, is 3V, and in the negative polarity application period TN, the pixel voltage Vp(i,j) is at the L-level (0V) and the applied voltage Vlc(i,j) applied to the display element 23*a* is −3V. Note that when the L-level voltage (0V) indicating the black display is applied from the corresponding data signal line DLj to the first node NA and held thereat and the H-level (3V) is held at the second node NB, the pixel voltage Vp(i,j) is at the L-level (0V) and the applied voltage Vlc(i,j) applied to the display element 23*a* is 0V in the positive polarity application period TP, and the pixel voltage Vp(i,j) is at the H-level (3V) and the applied voltage Vlc(i,j) applied to the display element 23*a* is 0V in the negative polarity application period TN.

According to the pixel circuit illustrated in FIG. 3, which operates as described above, when the corresponding scanning signal line GLi is selected and the voltage of the corresponding data signal line DLj is written to the pixel memory circuit 21*a* as the data voltage, as a result of a signal being selected from the first AC drive signal VAd and the second AC drive signal VBd, the display element 23*a* can be AC-driven without rewriting the data voltage in the pixel memory circuit 21*a* (see FIG. 4). However, a pixel memory-type display device using the above-described pixel circuit 20*a*, which is the comparative example, has the following problems.

As described above, in the pixel circuit illustrated in FIG. 3, the voltage levels that can be used by the first AC drive signal VAd and the second AC drive signal VBd to be selected in the voltage selection circuit 22*a* are 3V and 0V, and the voltage levels that can be used by the first AC drive signal VAd or the second AC drive signal VBd applied to the gate terminals of the transistors T6 to T9 included in the two analog switches constituting the voltage selection circuit 22*a* are also 3V and 0V. Under such operating conditions, both of the two analog switches have a configuration in which N-channel transistors and P-channel transistors are connected in parallel. Therefore, many transistors are required in one pixel circuit, and thus the pixel circuit configured as illustrated in FIG. 3 cannot be used for a high-resolution display device. In this regard, in order to reduce the number of transistors in one pixel circuit, it is conceivable to constitute each of the two analog switches using only one transistor. However, in such a configuration, a so-called "threshold drop" occurs in the voltage selection circuit 22*a*, and the voltage that can be obtained at the third node NC, that is, the pixel voltage Vp(i,j) to be applied to the pixel electrode 24, becomes slightly different from the voltage selected from the voltages of the first AC drive signal VAd and the second AC drive signal VBd. For example, when each of the two analog switches is constituted by only one N-channel transistor, and when the voltage to be selected is the high-level voltage of 3V, the voltage that can be obtained at the third node NC is a voltage that is lower than 3V by a threshold voltage Vtn (>0) of the N-channel transistor.

1.2.2 Configuration and Operation of Pixel Circuit of Present Embodiment

Figure 5:
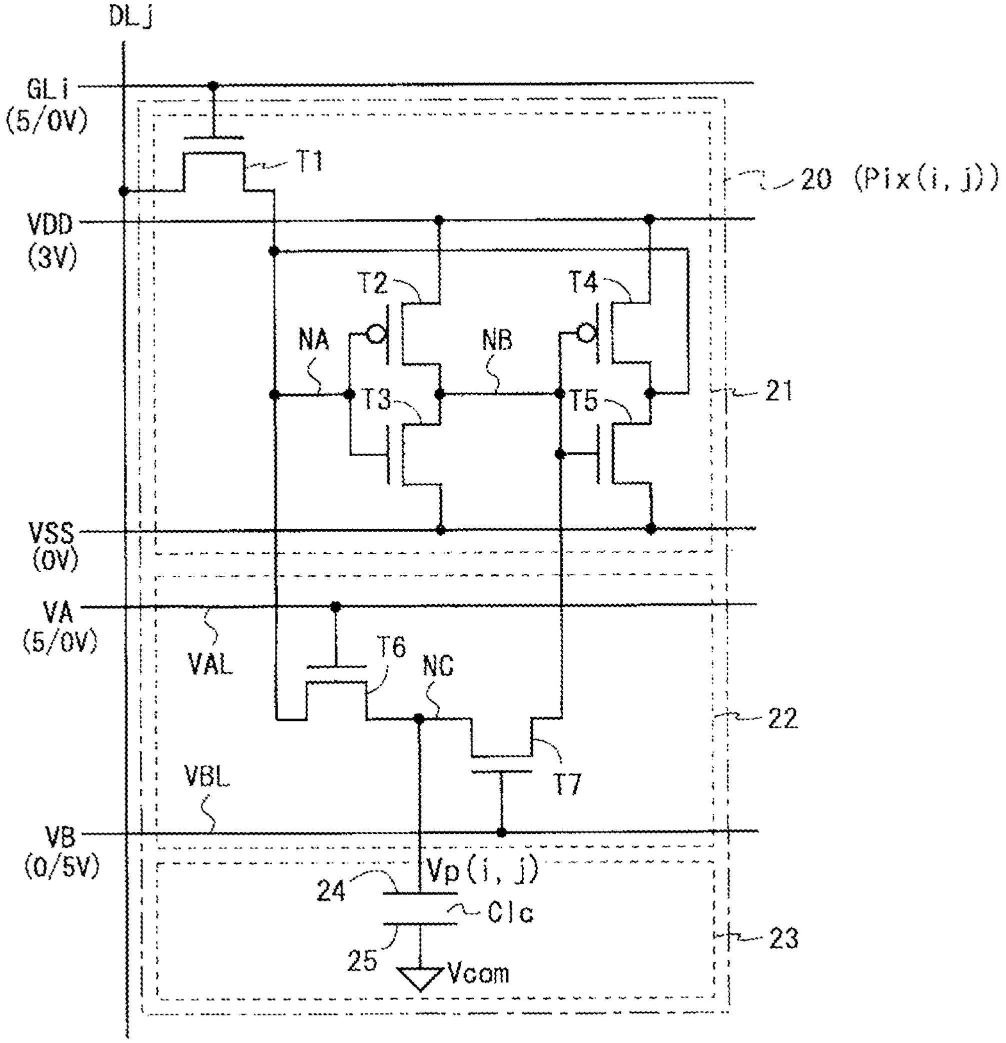
FIG. 5 is a circuit diagram illustrating a configuration of a pixel circuit according to the first embodiment.

FIG. 5 is a circuit diagram illustrating a configuration of the pixel circuit 20 according to the present embodiment, more specifically, a configuration of the pixel circuit Pix(i,j) of the i-th row and the j-th column according to the present embodiment. Similarly to the comparative example illustrated in FIG. 3, in the pixel circuit 20 (Pix(i,j)) according to the present embodiment, the scanning signal line (corresponding scanning signal line) GLi corresponding to the pixel circuit, the data signal line (corresponding data signal line) DLj corresponding to the pixel circuit, the first selection control line VAL, the second selection control line VBL, the high voltage side power source line VDD, and the low voltage side power source line VSS are connected, and the pixel circuit 20 (Pix(i,j)) includes a pixel memory circuit 21, a voltage selection circuit 22, and a display element 23.

As illustrated in FIG. 5, the pixel memory circuit 21 according to the present embodiment includes the N-channel write control transistor T1 functioning as the switching element, and the P-channel transistors T2, T4 and the N-channel transistors T3, T5 constituting the CMOS latch circuit as the bistable circuit, and is constituted similarly to the pixel memory circuit 21*a* in the comparative example illustrated in FIG. 3. In addition, similarly to the display element 23*a* in the comparative example illustrated in FIG. 3, the display element 23 in the present embodiment is also a liquid crystal display element including the pixel electrode 24, the common electrode 25, and the liquid crystal interposed therebetween. The liquid crystal capacitance Clc is formed by the pixel electrode 24, the common electrode 25, and the liquid crystal, and the common voltage signal Vcom is supplied to the common electrode 25.

On the other hand, the voltage selection circuit 22 in the present embodiment is different from the voltage selection circuit 22*a* in the comparative example illustrated in FIG. 3, and is configured as follows. Specifically, while the voltage selection circuit 22*a* in the comparative example includes the CMOS analog switch constituted by the N-channel transistor T6 and the P-channel transistor T7 connected in parallel with each other, and the CMOS analog switch constituted by the P-channel transistor T8 and the N-channel transistor T9 connected in parallel with each other, the voltage selection circuit 22 in the present embodiment includes the N-channel transistors T6, T7, but does not include the P-channel transistors. In addition, similarly to the voltage selection circuit 22*a* in the comparative example, the voltage selection circuit 22 includes the third node NC for outputting the voltage to be selected, and the third node NC is connected to the pixel electrode 24 in the display element 23. In the voltage selection circuit 22, the transistor T6 as the first selection transistor includes a first conduction terminal connected to the first node NA in the pixel memory circuit 21, a second conduction terminal connected to the third node NC, and a gate terminal as a control terminal connected to the first selection control line VAL, and the transistor T7 as the second selection transistor includes a first conduction terminal connected to the second node NB in the pixel memory circuit 21, a second conduction terminal connected to the third node NC, and a gate terminal as a control terminal connected to the second selection control line VBL.

Figure 6:
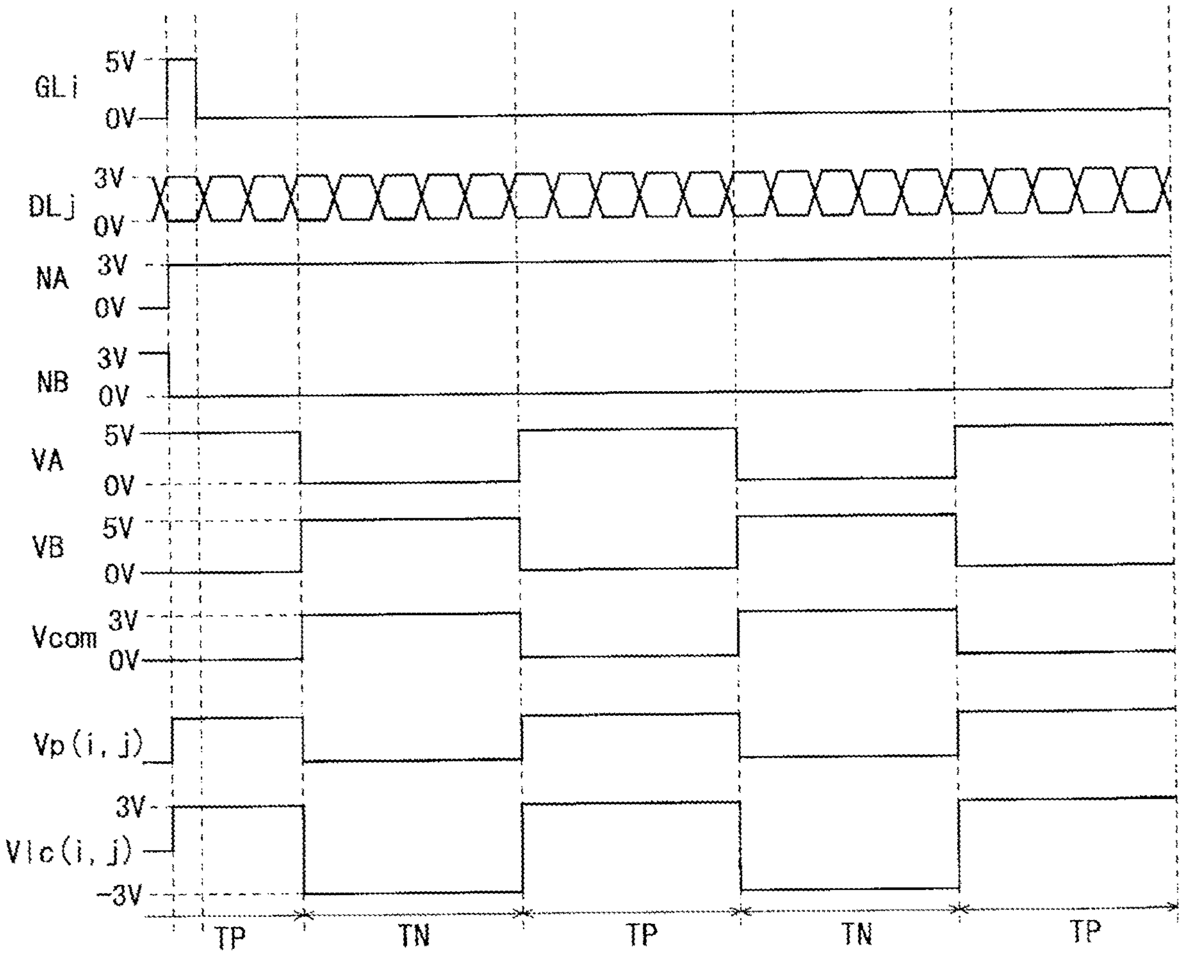
FIG. 6 is a timing chart for describing an operation of the pixel circuit according to the first embodiment.

FIG. 6 is a timing chart for describing an operation of the pixel circuit 20 illustrated in FIG. 5, that is, the pixel circuit Pix(i,j) of the i-th row and the j-th column in the present embodiment. As illustrated in FIG. 6, similarly to the comparative example (see FIGS. 3 and 4), among the signal lines connected to the pixel circuit 20 (Pix(i,j)) in the present embodiment, the voltage of the corresponding scanning signal line GLi in the non-select state is 0V indicating the L-level, and the voltage thereof in the select state is 5V indicating the H-level. In addition, the voltage of the corresponding data signal line DLj at the time of the white display is 3V indicating the H-level, and the voltage thereof at the time of the black display is 0V indicating the L-level. On the other hand, unlike in the comparative example, the voltage of the first selection control line VAL in the present embodiment is a control signal of the transistor T6 in the voltage selection circuit 22, and as illustrated in FIG. 6, the voltage of the first control line VAL is 5V indicating the H-level in the positive polarity application period TP in which the positive polarity voltage is to be applied to the display element 23, and is 0V indicating the L-level in the negative polarity application period TN in which the negative polarity voltage is to be applied to the display element 23. The voltage of the second selection control line VBL in the present embodiment is a control signal of the transistor T7 in the voltage selection circuit 22, and as illustrated in FIG. 6, the voltage of the second selection control line VBL is 0V indicating the L-level in the positive polarity application period TP, and is 5V indicating the H-level in the negative polarity application period TN. Note that, similarly to the comparative example (see FIGS. 3 and 4), the voltage of the common voltage signal Vcom is 0V indicating the L-level in the positive polarity application period TP, and is 3V indicating the H-level in the negative polarity application period TN.

As illustrated in FIG. 5, in the pixel circuit Pix(i,j) in the present embodiment, when the corresponding scanning signal line GLi is in the select state, that is, when the voltage of the corresponding scanning signal line GLi is at the H-level, the voltage of the corresponding data signal line DLj is applied to the first node NA via the write control transistor T1. As a result, the voltage (data voltage) of the corresponding data signal line Dlj is written to the pixel memory circuit 21 as pixel data, the voltage of the first node NA is set to the same level as the voltage of the corresponding data signal line DLj, and the voltage of the second node NB is set to the level obtained by inverting the voltage level of the first node NA. In the example illustrated in FIG. 6, it is assumed that the H-level voltage (3V) indicating the white display is written to the pixel memory circuit 21 as the data voltage. Specifically, when the corresponding scanning signal line GLi is in the select state, the voltage of the corresponding data signal line DLj is at the H-level (3V) indicating the white display, and as a result, the first node NA is set to the H-level and the second node NB is set to the L-level. Even when the voltage of the corresponding scanning signal line GLi is set to the L-level (0V) and the corresponding scanning signal line GLi enters into the non-select state, as illustrated in FIG. 6, the voltage of the first node NA is maintained at the H-level and the voltage of the second node NB is maintained at the L-level. Thereafter, the voltages of the first node NA and the second node NB are maintained as they are until the corresponding scanning signal line GLi enters into the select state and a new voltage of the corresponding data signal line DLj is applied to the first node NA.

As described above, in the present embodiment, in the positive polarity application period TP, the first selection control signal VA is 5V indicating the H-level, the second selection control signal VB is 0V indicating the L-level, and the voltage of the common voltage signal Vcom is 0V (see FIG. 6). In addition, in the example illustrated in FIG. 6, as described above, the H-level voltage (3V) indicating the white display is applied from the corresponding data signal line DLj to the first node NA and held thereat, and the L-level voltage (0V) is held at the second node NB.

Therefore, in the positive polarity application period TP, in the voltage selection circuit 22, the transistor T6 is in the ON state and the transistor T7 is in the OFF state, and the voltage of the first node NA in the pixel memory circuit 21 is applied to the pixel electrode 24 of the display element 23 via the third node NC, as the pixel voltage Vp(i,j). At this time, since the voltage of the first node NA is 3V indicating the H-level while the first selection control signal VA supplied to the gate terminal of the N-channel transistor T6 is 5V, 3V indicating the H-level of the first node NA is supplied as it is to the pixel electrode 24. However, it is assumed that the threshold voltage Vtn of the N-channel transistor T6 is smaller than 2V, which is the difference between 5V indicating the H-level of the first selection control signal VA and 3V indicating the H-level voltage of the first node NA. In this case, when the N-channel transistor T6 is to be turned on, since the voltage (5V) of the first selection control signal VA to be applied to the gate terminal thereof is higher than the H-level voltage (3V) of the first node NA by at least the threshold voltage Vtn of the transistor T6, the threshold drop does not occur.

In the present embodiment, the first selection control signal VA and the second selection control signal VB change in the mutually inverted manner as illustrated in FIG. 6, and in the negative polarity application period TN, the first selection control signal VA is 0V indicating the L-level, the second selection control signal VB is 5V indicating the H-level, and the voltage of the common voltage signal Vcom is 3V. In addition, as illustrated in FIG. 6, also in the negative polarity application period TN, in the pixel memory circuit 21, the voltage of the first node NA is held at 3V indicating the H-level, and the voltage of the second node NB is held at 0V indicating the L-level. Therefore, in the voltage selection circuit 22, the transistor T6 is in the OFF state and the transistor T7 is in the ON state, and the voltage of the second node NB, that is, the L-level voltage (0V), is applied as it is to the pixel electrode 24 of the display element 23 via the third node NC, as the pixel voltage Vp(i,j).

As described above, when the H-level voltage (3V) indicating the white display is written to the pixel memory circuit 21, the pixel voltage Vp(i,j) is 3V in the positive polarity application period TP and 0V in the negative polarity application period TN. On the other hand, as described above, the voltage of the common voltage signal Vcom is 0V in the positive polarity application period TP and is 3V in the negative polarity application period TN. Therefore, as illustrated in FIG. 6, the applied voltage Vlc(i,j) applied to the display element 23 as the liquid crystal display element is 3V in the positive polarity application period TP and is −3V in the negative polarity application period TN.

Unlike the example illustrated in FIG. 6, when the L-level voltage (0V) indicating the black display is written to the pixel memory circuit 21 as the data voltage, in the pixel memory circuit 21, the L-level voltage (0V) is held at the first node NA and the H-level voltage (3V) is held at the second node NB.

In this case, in the positive polarity application period TP, in the voltage selection circuit 22, the transistor T6 is in the ON state and the transistor T7 is in the OFF state, and the voltage of the first node NA in the pixel memory circuit 21, that is, the L-level voltage (0V), is applied as it is to the pixel electrode 24 of the display element 23 via the third node NC, as the pixel voltage Vp(i,j). On the other hand, in the negative polarity application period TN, in the voltage selection circuit 22, the transistor T6 is in the OFF state and the transistor T7 is in the ON state, and the voltage of the second node NB in the pixel memory circuit 21, that is, the H-level voltage (3V), is applied as it is to the pixel electrode 24 of the display element 23 via the third node NC, as the pixel voltage Vp(i,j). At this time, since the voltage of the second node NB is 3V indicating the H-level while the second selection control signal VB supplied to the gate terminal of the N-channel transistor T7 is 5V, 3V indicating the H-level of the second node NB is applied as it is to the pixel electrode 24. However, it is assumed that the threshold voltage Vtn of the N-channel transistor T7 is smaller than 2V, which is the difference between 5V indicating the H-level of the second selection control signal VB and 3V indicating the H-level voltage of the second node NB. In this case, when the N-channel transistor T7 is to be turned on, since the voltage (5V) of the second selection control signal VB to be applied to the gate terminal thereof is higher than the H-level voltage of the second node NB by at least the threshold voltage Vtn of the transistor T7, the threshold drop does not occur.

As described above, when the L-level voltage (0V) indicating the black display is written to the pixel memory circuit 21, the pixel voltage Vp(i,j) is 0V in the positive polarity application period TP and 3V in the negative polarity application period TN. On the other hand, as described above, the voltage of the common voltage signal Vcom is 0V in the positive polarity application period TP and is 3V in the negative polarity application period TN. Therefore, the applied voltage Vlc(i,j) applied to the display element 23 is 0V in the positive polarity application period TP and is 0V in the negative polarity application period TN.

1.3 Effects

According to the present embodiment using the pixel circuit 20 that operates as described above, similarly to the pixel circuit 20*a* (FIGS. 3 and 4) as the comparative example, when the corresponding scanning signal line GLi is selected and the voltage of the corresponding data signal line DLj is written to the pixel memory circuit 21 as the data voltage, the first selection control signal VA and the second selection control signal VB, which change in the mutually inverted manner, are supplied to the voltage selection circuit 22, and as a result, the display element 23 is AC-driven without rewriting the data voltage of the pixel memory circuit 21 (see FIG. 6).

Further, in the present embodiment, unlike in the voltage selection circuit 22*a* of the comparative example in which four transistors are used, the voltage (the voltage of the first node NA or the second node NB) selected by the voltage selection circuit 22 constituted by the two N-channel transistors T6, T7 is applied to the pixel electrode 24 of the display element 23. As can be understood from the above description, when the transistor T6 is to be turned on, the voltage (5V) of the first selection control signal VA to be applied to the gate terminal thereof is higher than the higher voltage of the H-level and the L-level voltages of the first node NA, that is, the higher voltage (3V) of the power source voltages VDD, VSS supplied to the pixel memory circuit 21, by at least the threshold voltage Vtn of the transistor T6, and thus, the threshold drop does not occur. In addition, even when the transistor T7 is to be turned on, the voltage (5V) of the second selection control signal VB to be applied to the gate terminal thereof is higher than the higher voltage of the H-level and the L-level voltages of the second node NB, that is, the higher voltage (3V) of the power source voltages VDD, VSS, by at least the threshold voltage Vtn of the transistor T7, and thus, the threshold drop does not occur. Thus, the voltage selected by the voltage selection circuit 22 (the voltage of the first node NA or the second node NB) is applied as it is to the pixel electrode 24 of the display element 23 without being affected by the threshold voltages of the transistors T6, T7. Therefore, according to the present embodiment, it is possible to provide an AC-driven pixel memory-type display device using a pixel circuit constituted by a smaller number of transistors than that of a known pixel circuit without causing the display performance to deteriorate. As a result, display of a high-resolution image, which has not been able to be realized by a known AC-driven pixel memory-type display device, becomes possible.

2. Second Embodiment

Next, the pixel memory-type display device 10 according to a second embodiment will be described. This pixel memory-type display device 10 has the same configuration as that of the pixel memory-type display device 10 according to the first embodiment except for the configuration of the pixel circuit 20 and the first selection control signal VA and the second selection control signal VB (see FIGS. 1, 5, and 6). Of the configuration of the pixel memory-type display device 10 according to the present embodiment, the same or corresponding constituent elements as those of the pixel memory-type display device 10 according to the first embodiment are denoted by the same reference signs, and detailed description thereof will be omitted.

Figure 7:
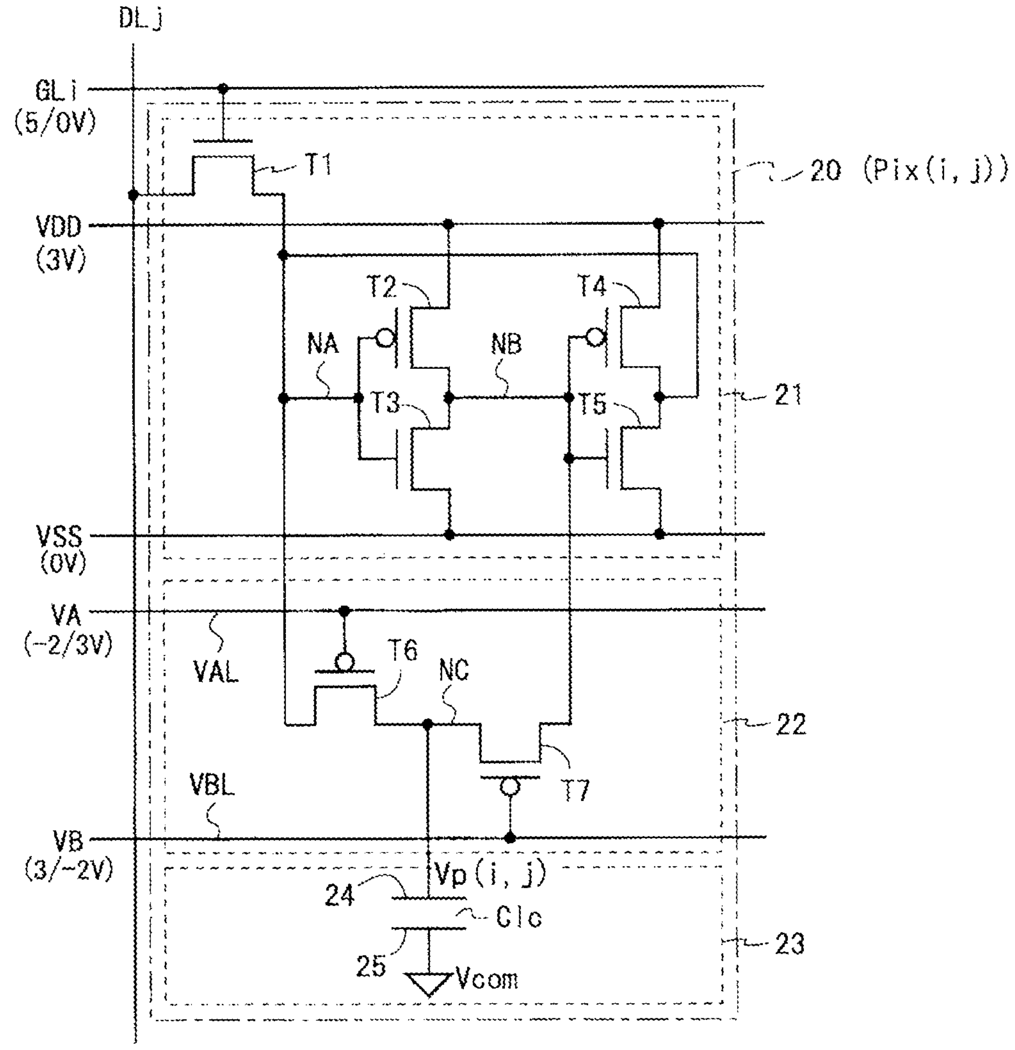
FIG. 7 is a circuit diagram illustrating a configuration of the pixel circuit in the pixel memory-type display device according to a second embodiment.

FIG. 7 is a circuit diagram illustrating a configuration of the pixel circuit 20 according to the present embodiment, more specifically, a configuration of the pixel circuit Pix(i,j) of the i-th row and the j-th column according to the present embodiment. Similarly to the pixel circuit 20 according to the first embodiment, in the pixel circuit 20 (Pix(i,j)) according to the present embodiment, the scanning signal line (corresponding scanning signal line) GLi corresponding to the pixel circuit, the data signal line (corresponding data signal line) DLj corresponding to the pixel circuit, the first selection control line VAL, the second selection control line VBL, the high voltage side power source line VDD, and the low voltage side power source line VSS are connected, and the pixel circuit 20 (Pix(i,j)) includes the pixel memory circuit 21, the voltage selection circuit 22, and the display element 23.

As illustrated in FIG. 7, the pixel circuit 20 according to the present embodiment has the same configuration as the pixel circuit 20 (see FIG. 5) according to the first embodiment except for the voltage selection circuit 22. The voltage selection circuit included in the pixel circuit 20 according to the present embodiment (hereinafter referred to as a "present embodiment voltage selection circuit") 22 is constituted by the two transistors T6, T7 similarly to the voltage selection circuit included in the pixel circuit 20 according to the first embodiment (hereinafter referred to as a "first embodiment voltage selection circuit") 22, but these transistors T6, T7 are not N-channel but P-channel transistors. Similarly to the first embodiment voltage selection circuit 22, the present embodiment voltage selection circuit 22 includes the third node NC for outputting the voltage to be selected, and the third node NC is connected to the pixel electrode 24 in the display element 23. In addition, similarly to the first embodiment voltage selection circuit 22, in the present embodiment voltage selection circuit 22, the transistor T6 includes the first conduction terminal connected to the first node NA in the pixel memory circuit 21, the second conduction terminal connected to the third node NC, and the gate terminal as the control terminal connected to the first selection control line VAL, and the transistor T7 includes the first conduction terminal connected to the second node NB in the pixel memory circuit 21, the second conduction terminal connected to the third node NC, and the gate terminal as the control terminal connected to the second selection control line VBL.

Figure 8:
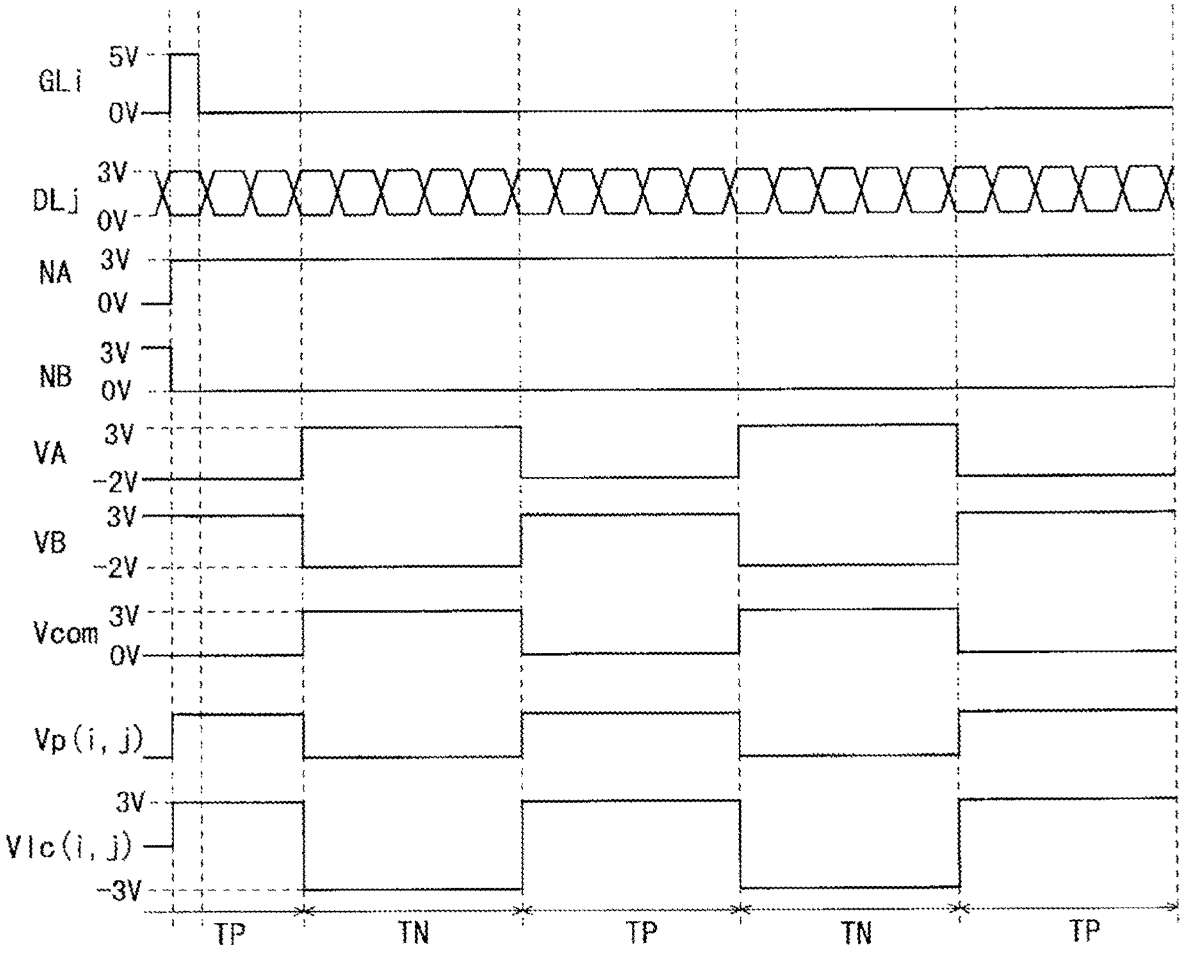
FIG. 8 is a timing chart for describing an operation of the pixel circuit according to the second embodiment.

FIG. 8 is a timing chart for describing an operation of the pixel circuit 20 illustrated in FIG. 7, that is, the pixel circuit Pix(i,j) of the i-th row and the j-th column in the present embodiment. Among the signals for driving the pixel circuit Pix(i,j) in the present embodiment, namely, among the scanning signal applied to the corresponding scanning signal line GLi, the data signal applied to the corresponding data signal line DLj, the first selection control signal VA, the second selection control signal VB, and the common voltage signal Vcom, the signals other than the first selection control signal VA and the second selection control signal VB change similarly to the signals for driving the pixel circuit Pix(i,j) in the first embodiment (see FIGS. 6 and 8).

Although the first selection control signal VA and the second selection control signal VB in the present embodiment change in the mutually inverted manner in a similar manner as in the first embodiment, since the transistors T6, T7 in the voltage selection circuit 22 are of the P-channel type, the first selection control signal VA and the second selection control signal VB in the present embodiment are signals in which the H-level periods and the L-level periods are reversed with respect to those in the first embodiment (see FIGS. 6 and 8). Thus, in the present embodiment, in the positive polarity application period (the period in which the positive polarity voltage is applied to the display element 23) TP, the first selection control signal VA is at the L-level and the second selection control signal VB is at the H-level, and in the negative polarity application period (the period in which the negative polarity voltage is applied to the display element 23) TN, the first selection control signal VA is at the H-level and the second selection control signal VB is at the L-level. In addition, as illustrated in FIG. 8, in the first selection control signal VA and the second selection control signal VB in the present embodiment, the H-level corresponds to 3V and the L-level corresponds to −2V. In this regard also, the second embodiment is different from the first embodiment.

In the example illustrated in FIG. 8 also, when the corresponding scanning signal line GLi is in the select state, the corresponding data signal line DLj is at the H-level (3V) indicating the white display. In this way, the H-level voltage (3V) indicating the white display is written to the pixel memory circuit 21 as the data voltage. As a result, the H-level voltage (3V) is held at the first node NA, and the L-level voltage (0V) is held at the second node NB. In the positive polarity application period TP, in the voltage selection circuit 22, the transistor T6 is in the ON state and the transistor T7 is in the OFF state, and the H-level voltage (3V) held at the first node NA in the pixel memory circuit 21 is applied as it is to the pixel electrode 24 of the display element 23 via the P-channel transistor T6 and the third node NC, as the pixel voltage Vp(i,j). On the other hand, in the negative polarity application period TN, in the voltage selection circuit 22, the transistor T6 is in the OFF state and the transistor T7 is in the ON state, and the L-level voltage (0V) held at the second node NB in the pixel memory circuit 21 is applied as it is to the pixel electrode 24 of the display element 23 via the P-channel transistor T7 and the third node NC, as the pixel voltage Vp(i,j). At this time, since the voltage of the second node NB is 0V indicating the L-level while the second selection control signal VB supplied to the gate terminal of the P-channel transistor T7 is −2V, 0V indicating the L-level of the second node NB is supplied as it is to the pixel electrode 24. However, the absolute value of a threshold voltage Vtp of the P-channel transistor T7 is smaller than 2V, which is the difference between 0V indicating the L-level voltage of the second node NB and −2V indicating the L-level of the second selection control signal VB. In this case, when the P-channel transistor T7 is to be turned on, the voltage (−2V) of the second selection control signal VB applied to the gate terminal thereof is lower than the L-level voltage of the second node NB by at least the threshold voltage Vtp of the transistor T7, and thus, the threshold drop does not occur.

As described above, when the H-level voltage (3V) indicating the white display is written to the pixel memory circuit 21, the pixel voltage Vp(i,j) is 3V in the positive polarity application period TP and 0V in the negative polarity application period TN. On the other hand, the voltage of the common voltage signal Vcom is 0V in the positive polarity application period TP and is 3V in the negative polarity application period TN. Therefore, as illustrated in FIG. 8, in a similar manner as in the first embodiment (see FIG. 6), the applied voltage Vlc(i,j) applied to the display element 23 is 3V in the positive polarity application period TP and is −3V in the negative polarity application period TN.

Unlike the example illustrated in FIG. 8, when the L-level voltage (0V) indicating the black display is written to the pixel memory circuit 21 as the data voltage, in the pixel memory circuit 21, the L-level voltage (0V) is held at the first node NA and the H-level voltage (3V) is held at the second node NB.

In this case, in the positive polarity application period TP, in the voltage selection circuit 22, the transistor T6 is in the ON state and the transistor T7 is in the OFF state, and the L-level voltage (0V) held at the first node NA in the pixel memory circuit 21 is applied to the pixel electrode 24 of the display element 23 via the P-channel transistor T6 and the third node NC, as the pixel voltage Vp(i,j). At this time, since the voltage of the first node NA is 0V indicating the L-level while the first selection control signal VA supplied to the gate terminal of the P-channel transistor T6 is −2V, 0V indicating the L-level of the first node NA is supplied as it is to the pixel electrode 24. However, it is assumed that the threshold voltage Vtp of the P-channel transistor T6 is smaller than 2V, which is the difference between 0V indicating the L-level of the first node NA and −2V indicating the L-level voltage of the first selection control signal VA. In this case, when the P-channel transistor T6 is to be turned on, the voltage (−2V) of the first selection control signal VA applied to the gate terminal thereof is lower than the L-level voltage of the first node NA by at least the threshold voltage Vtp of the transistor T6, and thus, the threshold drop does not occur. On the other hand, in the negative polarity application period TN, in the voltage selection circuit 22, the transistor T6 is in the OFF state and the transistor T7 is in the ON state, and the voltage of the second node NB in the pixel memory circuit 21, that is, the H-level voltage (3V), is applied as it is to the pixel electrode 24 of the display element 23 via the third node NC, as the pixel voltage Vp(i,j).

As described above, when the L-level voltage (0V) indicating the black display is written to the pixel memory circuit 21, the pixel voltage Vp(i,j) is 0V in the positive polarity application period TP and 3V in the negative polarity application period TN. On the other hand, as described above, the voltage of the common voltage signal Vcom is 0V in the positive polarity application period TP and is 3V in the negative polarity application period TN. Therefore, in a similar manner as in the first embodiment (see FIG. 6), the applied voltage Vlc(i,j) applied to the display element 23 is 0V in the positive polarity application period TP and is 0V in the negative polarity application period TN.

As can be understood from the above description, in the present embodiment also, when the transistor T6, of the two P-channel transistors T6, T7 constituting the voltage selection circuit 22, is to be turned on, the voltage (−2V) of the first selection control signal VA applied to the gate terminal thereof is lower than the lower voltage of the H-level and the L-level voltages of the first node NA, that is, the lower voltage (0V) of the power source voltages VDD and VSS supplied to the pixel memory circuit 21, by at least the threshold voltage Vtp of the transistor T6, and thus, the threshold drop does not occur. In addition, even when the transistor T7 is to be turned on, the voltage (−2V) of the second selection control signal VB applied to the gate terminal thereof is lower than the lower voltage of the H-level and the L-level voltages of the second node NB, that is, the lower voltage (0V) of the power source voltages VDD and VSS, by at least the threshold voltage Vtp of the transistor T7, and thus, the threshold drop does not occur. Thus, the voltage selected by the voltage selection circuit 22 (the voltage of the first node NA or the second node NB) is applied as it is to the pixel electrode 24 of the display element 23 without being affected by the threshold voltages of the transistors T6, T7.

Therefore, effects similar to those of the first embodiment can also be obtained in the present embodiment. Specifically, when the corresponding scanning signal line GLi is selected and the voltage of the corresponding data signal line DLj is written to the pixel memory circuit 21 as the data voltage, due to the first selection control signal VA and the second selection control signal VB that change in the mutually inverted manner, the display element 23 is AC-driven without rewriting the data voltage of the pixel memory circuit 21 (see FIG. 8), and in addition, display of a high-resolution image, which has not been able to be realized by a known AC-driven pixel memory-type display device, becomes possible.

3. Third Embodiment

In both the first embodiment and the second embodiment described above, in the pixel memory circuit 21, the H-level and L-level voltages are held at the first node NA and the second node NB in the mutually inverted manner. The first node NA is connected to the third node NC via the transistor T6 in the voltage selection circuit 22, the second node NB is connected to the third node NC via the transistor T7 in the voltage selection circuit 22, and these transistors T6, T7 are configured to be turned on/off in the mutually inverted manner by the first selection control signal VA and the second selection control signal VB (see FIGS. 5 to 7). In such a configuration, when the voltage levels of the first selection control signal VA and the second selection control signal VB are switched simultaneously, there is a possibility that the first node NA and the second node NB, at which the H-level and L-level voltages are held in the mutually inverted manner, may be short-circuited, and an excessive current may flow or a malfunction may occur in the pixel circuit 20.

Therefore, in the pixel memory-type display device according to a third embodiment, timings at which the first selection control signal VA and the second selection control signal VB change are adjusted so that such a problem does not occur. The third embodiment having such a configuration will be described below.

The pixel memory-type display device according to the present embodiment has the same configuration as that of the pixel memory-type display device 10 according to the first embodiment except for the configuration related to the first selection control signal VA and the second selection control signal VB (see FIGS. 1, 5, and 6). Hereinafter, of the configuration of the pixel memory-type display device according to the present embodiment, the same or corresponding constituent elements as those of the pixel memory-type display device 10 according to the first embodiment are denoted by the same reference signs, and detailed description thereof will be omitted.

Figure 9:
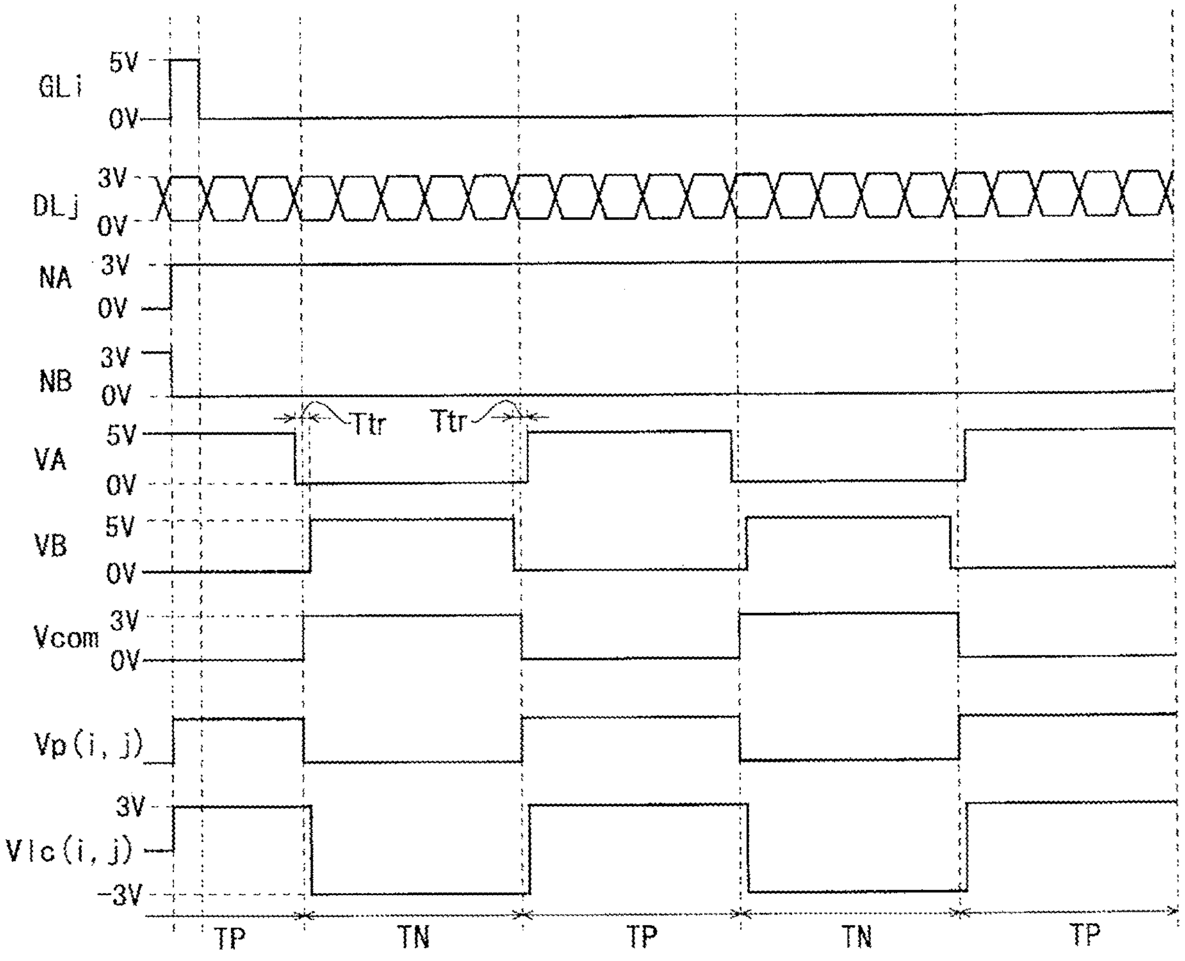
FIG. 9 is a timing chart for describing an operation of the pixel circuit in the pixel memory-type display device according to a third embodiment.

FIG. 9 is a timing chart for describing an operation of the pixel circuit Pix(i,j) of the i-th row and the j-th column in the present embodiment. Among the signals for driving the pixel circuit Pix(i,j) in the present embodiment, namely, among the scanning signal applied to the corresponding scanning signal line GLi, the data signal applied to the corresponding data signal line DLj, the first selection control signal VA, the second selection control signal VB, and the common voltage signal Vcom, the signals other than the first selection control signal VA and the second selection control signal VB change similarly to the signals for driving the pixel circuit Pix(i,j) in the first embodiment (see FIGS. 6 and 8).

Although the first selection control signal VA and the second selection control signal VB in the present embodiment change in the mutually inverted manner in a similar manner as in the first embodiment, as illustrated in FIG. 9, unlike the first embodiment, the voltage levels of the first selection control signal VA and the second selection control signal VB do not change simultaneously in the present embodiment. Specifically, when the first selection control signal VA and the second selection control signal VB change from the L-level (0V) to the H-level (5V), respectively, each of the first selection control signal VA and the second selection control signal VB changes to the H-level after a transition period Ttr in which both the first selection control signal VA and the second selection control signal VB are at the L-level. When the above-described first selection control signal VA and second selection control signal VB are generated by the selection control circuit 210 in the display control circuit 200 and supplied to each of the pixel circuits Pix(i,j) in the display portion 100, when each of the transistors T6, T7 changes from the OFF state to the ON state in the voltage selection circuit 22 in each of the pixel circuits Pix(i,j), each of the transistors T6, T7 changes to the ON state after the transition period Ttr in which both transistors T6, T7 are in the OFF state. As a result, although the transistors T6, T7 are turned on/off in the mutually inverted manner, the transistor T6 changes from the OFF state to the ON state when the transistor T7 is in the OFF state, and the transistor T7 changes from the OFF state to the ON state when the transistor T6 is in the OFF state. Thus, the first node NA and the second node NB, at which the H-level and L-level voltages are held in the mutually inverted manner, are not short-circuited.

In the present embodiment, in accordance with the above-described timings at which the first selection control signal VA and the second selection control signal VB change, timings at which the pixel voltage Vp(i,j) and the applied voltage Vlc(i,j) applied to the display element 23 change are different from those in the first embodiment (see FIGS. 6 and 9). However, as illustrated in FIG. 9, since the transition period Ttr in which both the first selection control signal VA and the second selection control signal VB are at the L-level is sufficiently shorter than a polarity inversion cycle of the applied voltage Vlc(i,j) applied to the display element 23, the pixel circuit Pix(i,j) in the present embodiment operates substantially in the same manner as the pixel circuit Pix(i,j) in the first embodiment.

Therefore, according to the present embodiment, effects similar to those of the first embodiment can be obtained without causing an excessive current or a malfunction due to the short circuit between the first node NA and the second node NB in the pixel circuit.

4. Fourth Embodiment

In the first to third embodiments described above, in all the pixel circuits 20 in the display portion 100, the polarity of the applied voltage Vlc(i,j) applied to the display element 23 is inverted simultaneously by the first selection control signal VA and the second selection control signal VB. Thus, at a time of the inversion, a large current flows from the power source circuit 500 to the display portion 100. On the other hand, from the power source circuit 500, the power source voltage is supplied not only to the display portion 100 but also to the binary driver 300 and the gate driver 400. Therefore, as a result of the current flowing from the power source circuit 500 to the display portion 100 significantly increasing at the time when the polarity of the applied voltage Vlc(i,j) applied to the display element 23 is inverted, a voltage drop may occur in the high voltage side power source line and the low voltage side power source line, and the power source voltages VDD and VSS may be affected by the voltage drop as illustrated in FIG. As a result, there is a possibility that the binary driver 300 and the gate driver 400 may malfunction.

Thus, the pixel memory-type display device according to a fourth embodiment is configured such that operations of the binary driver 300 and the gate driver 400 are stopped for a predetermined time period including the timing at which the polarity of the applied voltage Vlc(i,j) applied to the display element 23 is inverted, that is, for a predetermined time period including the timing at which the voltage levels of the first selection control signal VA and the second selection control signal VB are switched. However, the length of the predetermined time period is set to be short enough not to affect the driving of the data signal lines DL1 to DLm by the binary driver 300 and the driving of the scanning signal lines GL1 to GLn by the gate driver 400.

Note that the configuration for stopping the operations of the binary driver 300 and the gate driver 400 for the predetermined time period is not particularly limited, and any one of the following configurations is conceivable, for example.

(1) A configuration in which the supply of a clock signal included in the data side control signal Scd supplied from the display control circuit 200 to the binary driver 300 is stopped for the predetermined time period, and the supply of a clock signal included in the scanning side control signal Scs supplied from the display control circuit 200 to the gate driver 400 is stopped for the predetermined time period. (2) A configuration in which the supply of the power source voltage to the binary driver 300 and the gate driver 400 is stopped for the predetermined time period (the high voltage side power source voltage VDD is maintained at 0V).

Note that the configuration of the pixel memory-type display device according to the present embodiment is the same as that of the first embodiment except for the above-described configuration for stopping the operations of the binary driver 300 and the gate driver 400 for the predetermined time period.

According to the present embodiment as described above, even when the excessive current flows from the power source circuit 500 to the display portion 100 at the time when the polarity of the applied voltage Vlc(i,j) applied to the display element 23 is inverted, effects similar to those of the first embodiment can be obtained without causing the binary driver 300 and the gate driver 400 to malfunction.

Fifth Embodiment

Figure 10:
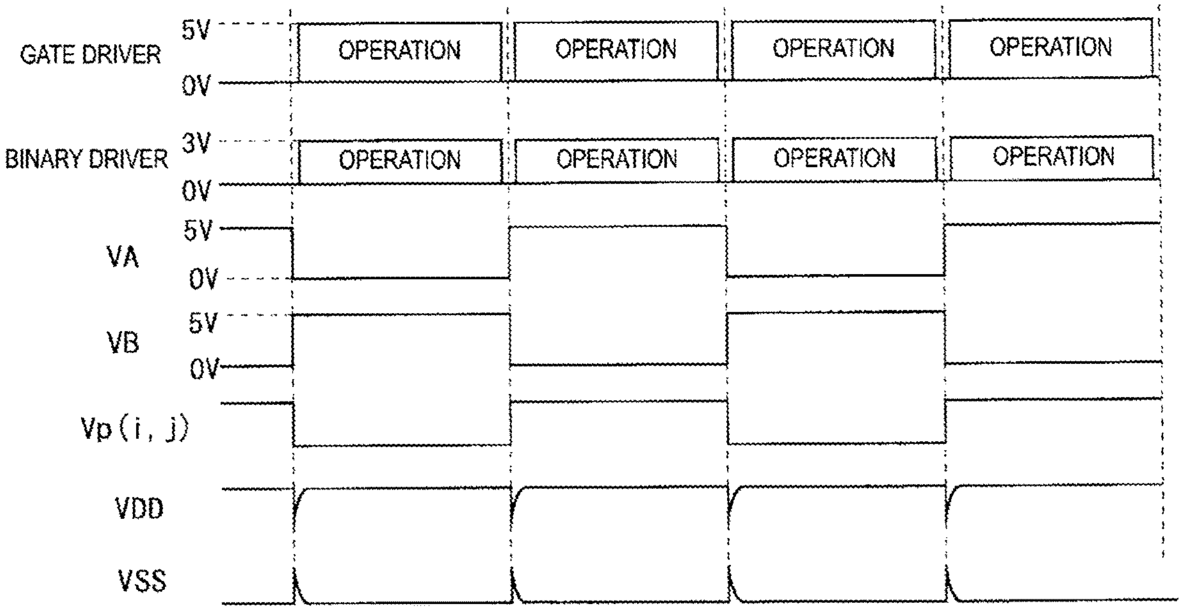
FIG. 10 is a timing chart for describing an operation of the pixel memory-type display device according to a fourth embodiment.

As described above, in the first to third embodiments, at the time when the polarity of the applied voltage Vlc(i,j) applied to the display element 23 in each of the pixel circuits is inverted, that is, when the voltage levels of the first selection control signal VA and the second selection control signal VB are switched, the current flowing from the power source circuit 500 to the display portion 100 is significantly increased. Accordingly, the voltage drop occurs in the high voltage side power source line and the low voltage side power source line, and as a result, there is a possibility that the binary driver 300 and the gate driver 400 may malfunction (see FIG. 10).

Thus, the pixel memory-type display device according to a fifth embodiment has a configuration in which the power source circuit 500 in the first embodiment is separated into a power source circuit for supplying the power source voltages VDD, VSS to the binary driver 300 and the gate driver 400, and a power source circuit for supplying the power source voltages VDD, VSS to the display portion 100.

Figure 11:
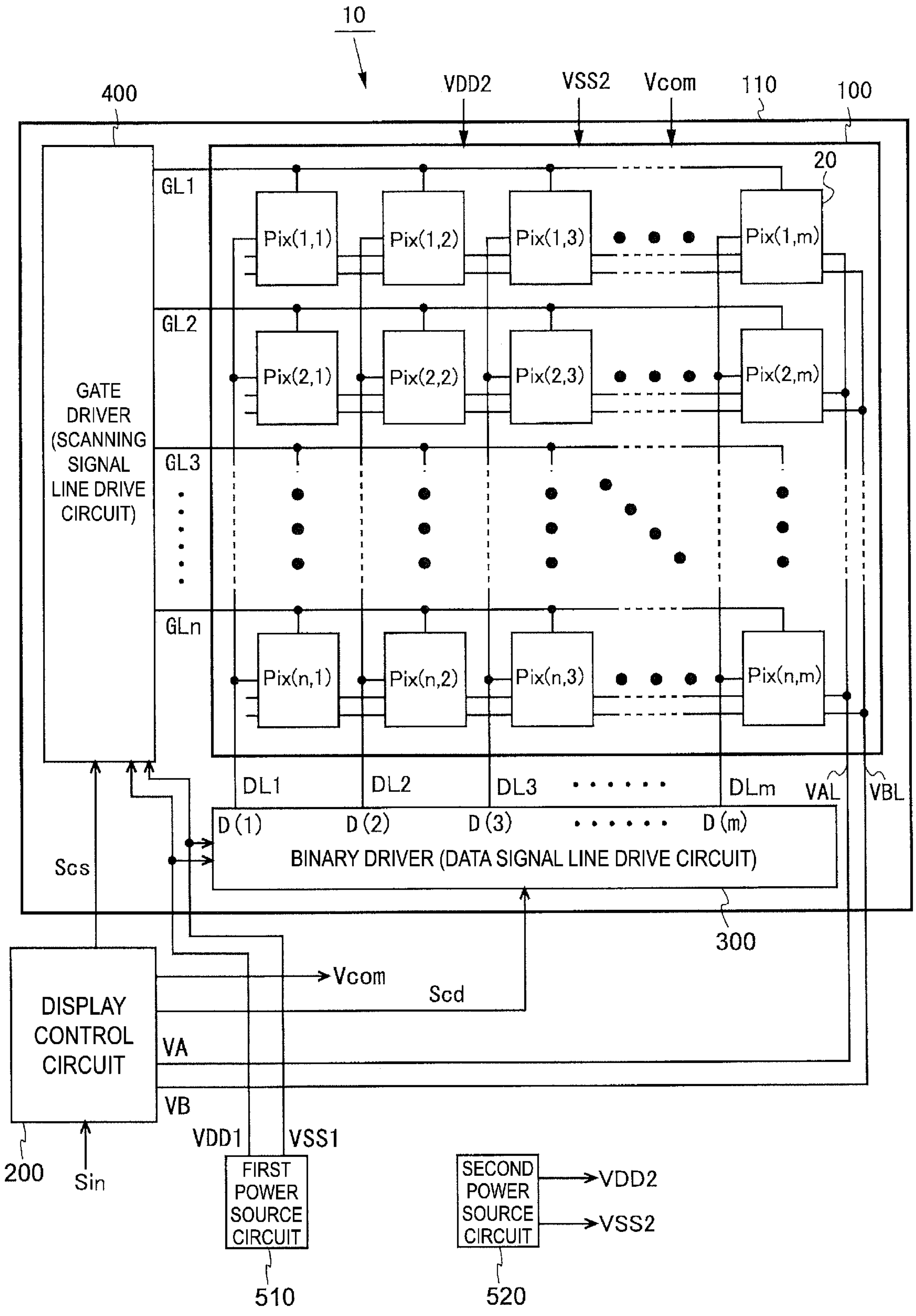
FIG. 11 is a block diagram illustrating a configuration of the pixel memory-type display device according to a fifth embodiment.

FIG. 11 is a block diagram illustrating a configuration of the pixel memory-type display device according to the fifth embodiment. As illustrated in FIG. 11, the pixel memory-type display device according to the present embodiment includes, instead of the power source circuit 500 in the first embodiment, two power source circuits constituted by a first power source circuit 510 and a second power source circuit 520 that generate power source voltages of the same level as those of the power source circuit 500. A high voltage side power source voltage VDD1 and a low voltage side power source voltage VSS1 generated by the first power source circuit 501 are supplied to the binary driver 300 and the gate driver 400, and a high voltage side power source voltage VDD2 and a low voltage side power source voltage VSS2 generated by the second power source circuit 520 are supplied to the display portion 100. Except for this configuration, the configuration of the pixel memory-type display device according to the present embodiment is the same as that of the first embodiment. Of the configuration of the pixel memory-type display device according to the present embodiment, the same or corresponding constituent elements as those of the pixel memory-type display device 10 according to the first embodiment described above are denoted by the same reference signs, and detailed description thereof will be omitted.

According to the present embodiment described above, even if the current supplied from the second power source circuit 520 to the display portion 100 is significantly increased at the time when the polarity of the applied voltage Vlc(i,j) applied to the display element 23 in each of the pixel circuits 20 is inverted, the power source voltages VDD1, VSS1 supplied to the binary driver 300 and the gate driver 400 are not affected by the increase in the current supplied to the display portion 100. Therefore, according to the present embodiment, in a similar manner as in the fourth embodiment, even when the excessive current flows from the power source circuit 500 to the display portion 100 at the time when the polarity of the applied voltage Vlc(i,j) applied to the display element 23 is inverted, effects similar to those of the first embodiment can be obtained without causing the binary driver 300 and the gate driver 400 to malfunction.

6. Sixth Embodiment

Figure 12:
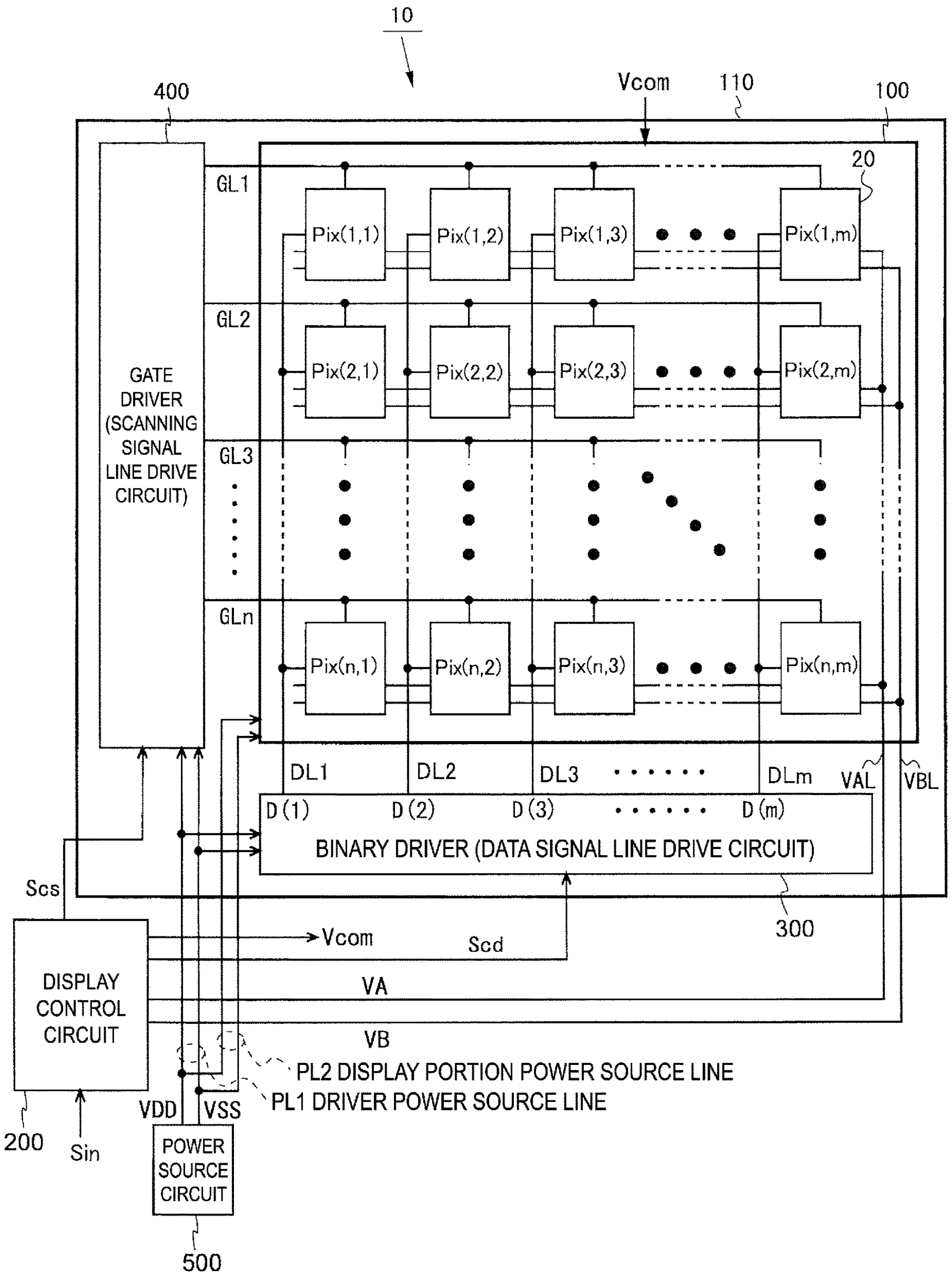
FIG. 12 is a block diagram illustrating a configuration of the pixel memory-type display device according to a sixth embodiment.

FIG. 12 is a block diagram illustrating a configuration of the pixel memory-type display device according to a sixth embodiment. In a similar manner as in the first embodiment, this pixel memory-type display device includes the binary driver 300, the gate driver 400, and the power source circuit 500 that generates the high voltage side power source voltage VDD1 and the low voltage side power source voltage VSS1 to be supplied to the display portion 100. However, this pixel memory-type display device differs from that of the first embodiment in the arrangement of power supply lines for supplying the power source voltages VDD, VSS from the power source circuit 500 to the binary driver 300, the gate driver 400, and the display portion 100.

As illustrated in FIG. 12, in the present embodiment, a power supply line for supplying the power source voltages VDD, VSS generated by the power source circuit 500 branches, in the vicinity of the power source circuit 500, into a power source line (hereinafter referred to as a "driver power source line") PL1 for supplying the power source voltages VDD, VSS to the binary driver 300 and the gate driver 400 and a power source line (hereinafter referred to as a "display portion power source line") PL2 for supplying the power source voltages VDD, VSS to (the m×n pixel circuits 20 in) the display portion 100. Except for this configuration, the configuration of the pixel memory-type display device according to the present embodiment is the same as that of the first embodiment. Of the configuration of the pixel memory-type display device according to the present embodiment, the same or corresponding constituent elements as those of the pixel memory-type display device 10 according to the first embodiment described above are denoted by the same reference signs, and detailed description thereof will be omitted.

In the present embodiment as described above, even when the excessive current flows from the power source circuit 500 to the display portion 100 at the time when the polarity of the applied voltage Vlc(i,j) applied to the display element 23 is inverted, and the voltage drop occurs in the display portion power source line PL2, this voltage drop hardly affects the power source voltages VDD, VSS supplied to the binary driver 300 and the gate driver 400 via the driver power source line PL1. Therefore, according to the present embodiment as described above, in a similar manner as in the fifth embodiment, even when the excessive current flows from the power source circuit 500 to the display portion 100 at the time when the polarity of the applied voltage Vlc(i,j) applied to the display element 23 is inverted, effects similar to those of the first embodiment can be obtained without causing the binary driver 300 and the gate driver 400 to malfunction.

7. Seventh Embodiment

In the pixel circuit 20 according to the first embodiment, in order to supply the voltage which is to be selected by the voltage selection circuit 22, and which is selected from the voltage held at the first node NC and the voltage held at the second node NB in the pixel memory circuit 21, to the pixel electrode 24 via the third node NC without causing the threshold drop to occur, the binary signals that change between 0V indicating the L-level and 5V indicating the H-level are used as the first selection control signal VA and the second selection control signal VB to be supplied to the gate terminals of the N-channel transistors T6, T7 in the voltage selection circuit 22 (see FIG. 6). On the other hand, a configuration is conceivable in which the selection control circuit 210 in the display control circuit 200 is configured to generate the first selection control signal VA and the second selection control signal VB as binary signals that change between 0V indicating the L-level and 3V indicating the H-level, for example, based on the high voltage side power source voltage of 3V and the low voltage side power source voltage of 0V. In such a case, a level shifter for the first selection control signal VA and the second selection control signal VB may be provided in the display panel 110.

Figure 13:
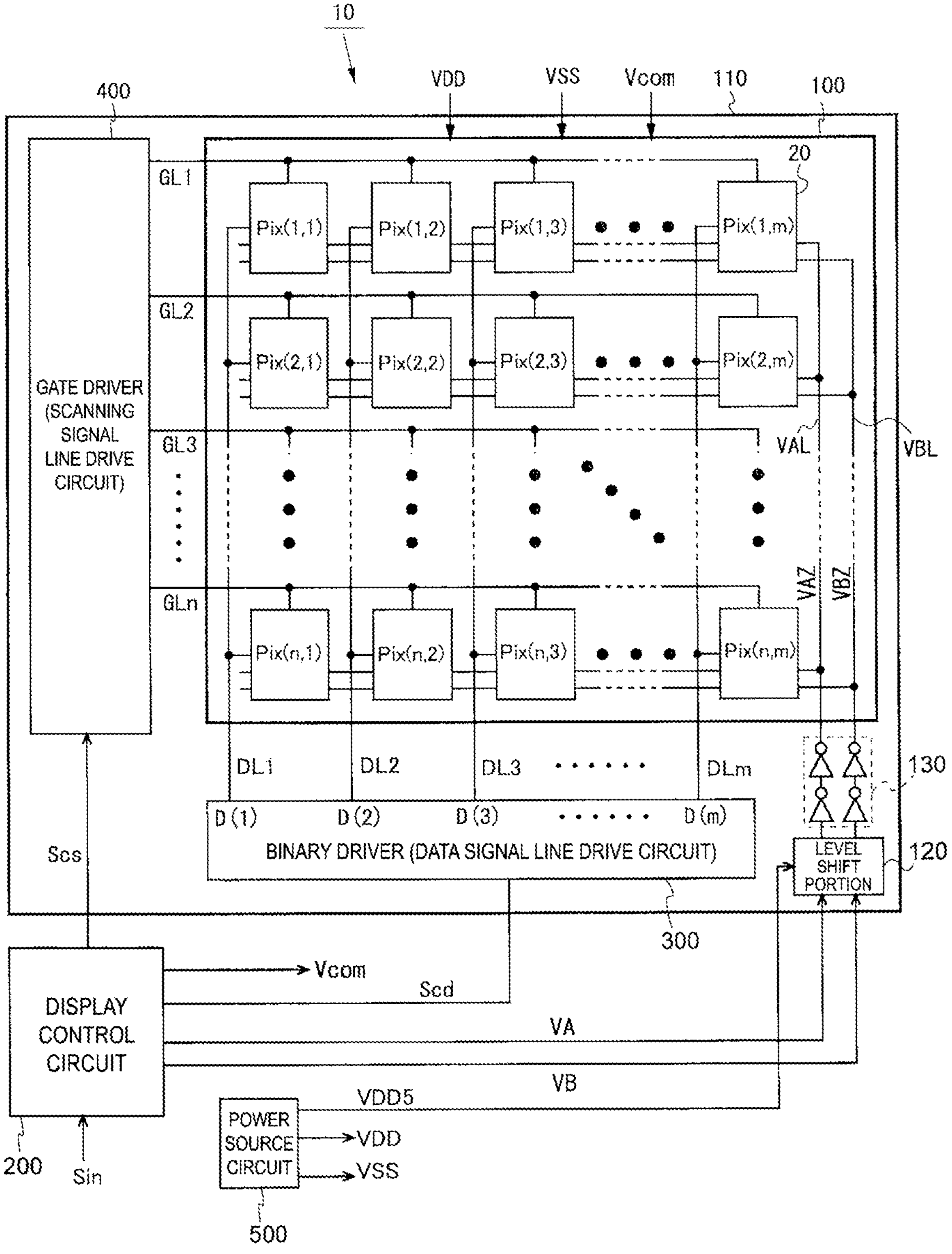
FIG. 13 is a block diagram illustrating a configuration of the pixel memory-type display device according to a seventh embodiment.

The pixel memory-type display device according to a seventh embodiment is a display device including such a level shifter for the first selection control signal VA and the second selection control signal VB. FIG. 13 is a block diagram illustrating a configuration of the pixel memory-type display device 10 according to the seventh embodiment. As illustrated in FIG. 13, in this pixel memory-type display device 10, the display control circuit 200 generates the first selection control signal VA and the second selection control signal VB as two binary signals that change in a mutually inverted manner between 0V indicating the L-level and 3V indicating the H-level, and these signals are input to the display panel 110. The display panel 110 is provided with a level shift portion 120 that converts the first selection control signal VA and the second selection control signal VB into signals each having a larger amplitude, and a buffer portion 130 for the converted first selection control signal VA and second selection control signal VB. Specifically, by converting the voltage levels of the first selection control signal VA and the second selection control signal VB, the level shift portion 120 generates a first selection control high voltage signal VAZ and a second selection control high voltage signal VBZ, which are two binary signals that change in a mutually inverted manner between 0V indicating the L-level and 5V indicating the H-level. The first selection control high voltage signal VAZ and the second selection control high voltage signal VBZ are applied to the first selection control line VAL and the second selection control line VBL formed in the display portion 100 from the level shift portion 120 via the buffer portion 130, and are supplied to each of the pixel circuits 20 by the first selection control line VAL and the second selection control line VBL (see FIGS. 13 and 5). Note that a high voltage side power source voltage VDD5 of 5V used in the level shift portion 120 is generated by the power source circuit 500 and supplied to the level shift portion 120. The pixel memory-type display device 10 according to the present embodiment has the same configuration as that of the pixel memory-type display device 10 according to the first embodiment except for the above-described configuration related to the level shift portion 120 for the first selection control signal VA and the second selection control signal VB (see FIGS. 1, 5, and 6). Of the configuration of the pixel memory-type display device according to the present embodiment, the same or corresponding constituent elements as those of the pixel memory-type display device 10 according to the first embodiment described above are denoted by the same reference signs, and detailed description thereof will be omitted.

Figure 14:
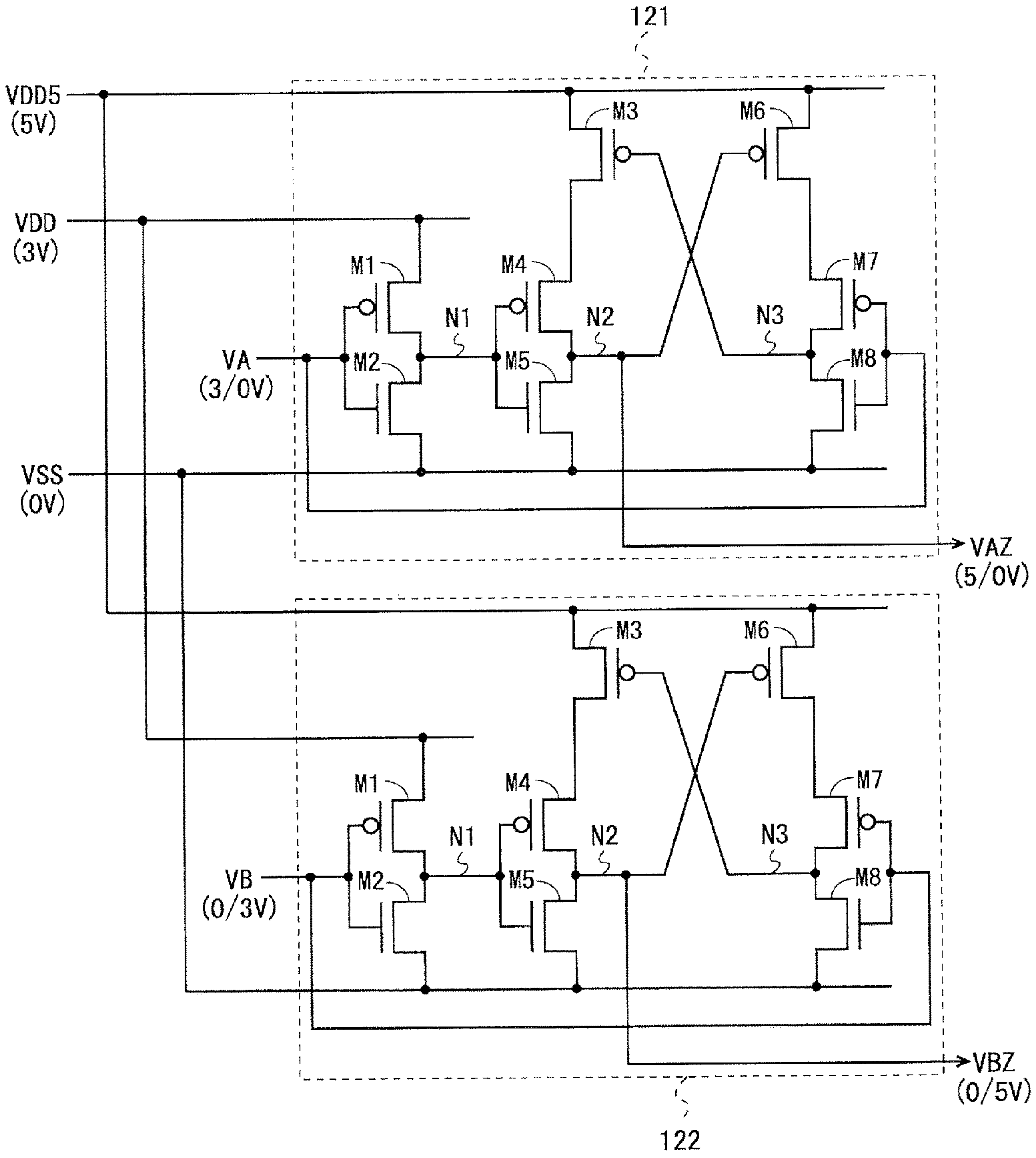
FIG. 14 is a circuit diagram illustrating a configuration example of a level shift portion according to the seventh embodiment.

FIG. 14 is a circuit diagram illustrating a configuration example of the level shift portion 120 according to the present embodiment. The level shift portion 120 includes a first level shifter 121 that converts the first selection control signal VA into the first selection control high voltage signal VAZ, and a second level shifter 122 that converts the second selection control signal VB into the second selection control high voltage signal VBZ. A configuration of the level shift portion 120 will be described below while focusing on the first level shifter 121.

As illustrated in FIG. 14, the first level shifter 121 is constituted by P-channel transistors M1, M3, M4, M6, M7 and N-channel transistors M2, M5, M8, and includes a node N1 to which a drain terminal of the transistor M1 and a drain terminal of the transistor M2 are connected, a node N2 to which a drain terminal of the transistor M4 and a drain terminal of the transistor M5 are connected, and a node N3 to which a drain terminal of the transistor M7 and a drain terminal of the transistor M8 are connected.

Gate terminals of the transistors M1, M2 are connected to each other, and the first selection control signal VA is supplied to these gate terminals. A source terminal of the transistor M1 is connected to the high voltage side power source line VDD that supplies the voltage of 3V, and a source terminal of the transistor M2 is connected to the low voltage side power source line VSS that supplies the voltage of 0V. Gate terminals of the transistors M4, M5 are connected to each other, and also connected to the node N1. Gate terminals of the transistors M7, M8 are connected to each other and also connected to the gate terminals of the transistors M1, M2, and the first selection control signal VA is supplied to the gate terminals of the transistors M7, M8. A source terminal of the transistor M4 is connected to a drain terminal of the transistor M3, and a source terminal of the transistor M5 is connected to the low voltage side power source line VSS. A source terminal of the transistor M7 is connected to a drain terminal of the transistor M6, and a source terminal of the transistor M8 is connected to the low voltage side power source line VSS. Source terminals of the transistors M3, M6 are connected to the high voltage side power source line VDD5 that supplies the voltage of 5V. A gate terminal of the transistor M3 and a gate terminal of the transistor M6 is connected to the node N3 and the node N2, respectively. In the first level shifter 121, the voltage of the node N2 is output as the first selection control high voltage signal VAZ.

As illustrated in FIG. 14, the second level shifter 122 is also configured similarly to the first level shifter 121 described above, using the P-channel transistors M1, M3, M4, M6, M7 and the N-channel transistors M2, M5, M8. In the second level shifter 122, the second selection control signal VB is supplied to the gate terminals of the transistors M1, M2, and the voltage of the node N2 is output as the second selection control high voltage signal VBZ.

The first selection control high voltage signal VAZ and the second selection control high voltage signal VBZ generated by the above-described level shift portion 120 constituted by the first level shifter 121 and the second level shifter 122 are applied, via the buffer portion 130, to the first selection control line VAL and the second selection control line VBL in the display portion 100, and are supplied to each of the pixel circuits 20 by the first selection control line VAL and the second selection control line VBL (see FIGS. 13 and 5). Here, when signal changes of the first selection control high voltage signal VAZ and the second selection control high voltage signal VBZ supplied to each of the pixel circuits 20 in the display portion 100 are steep, a voltage drop due to a large current flowing through the power source lines VDD5, VSS at a time of the signal changes reaches a level that can no longer be ignored, and there is a possibility that the voltage drop may cause a problem such as a malfunction. However, such a problem can be suppressed by setting the size (drive capability) of a buffer in the above-described buffer portion 130 to be small (setting the size of a transistor constituting the buffer to be smaller than the size of the transistor in the voltage selection circuit 22, for example).

According to the present embodiment as described above, since the level shift portion 120 is provided in the display panel 110, even when the first selection control signal VA and the second selection control signal VB generated by the selection control circuit 210 in the display control circuit 200 are the binary signals that change between 0V indicating the L-level and 3V indicating the H-level, the threshold drop does not occur in the voltage selection circuit 22 in each of the pixel circuits 20, and effects similar to those of the first embodiment can be obtained.

Note that the configuration of the first level shifter 121 and the second level shifter 122 described above is merely an example, and the configuration usable in the present embodiment is not limited to the configuration illustrated in FIG. 14.

8. Eighth Embodiment

In the seventh embodiment, in order to suppress the problem caused by the large current flowing through the power source lines VDD5, VSS at the time of the signal changes when the signal changes of the first selection control high voltage signal VAZ and the second selection control high voltage signal VBZ are steep, the size of the buffer in the buffer portion 130 provided on the output side of the level shift portion 120 is set to be small.

Figure 15:
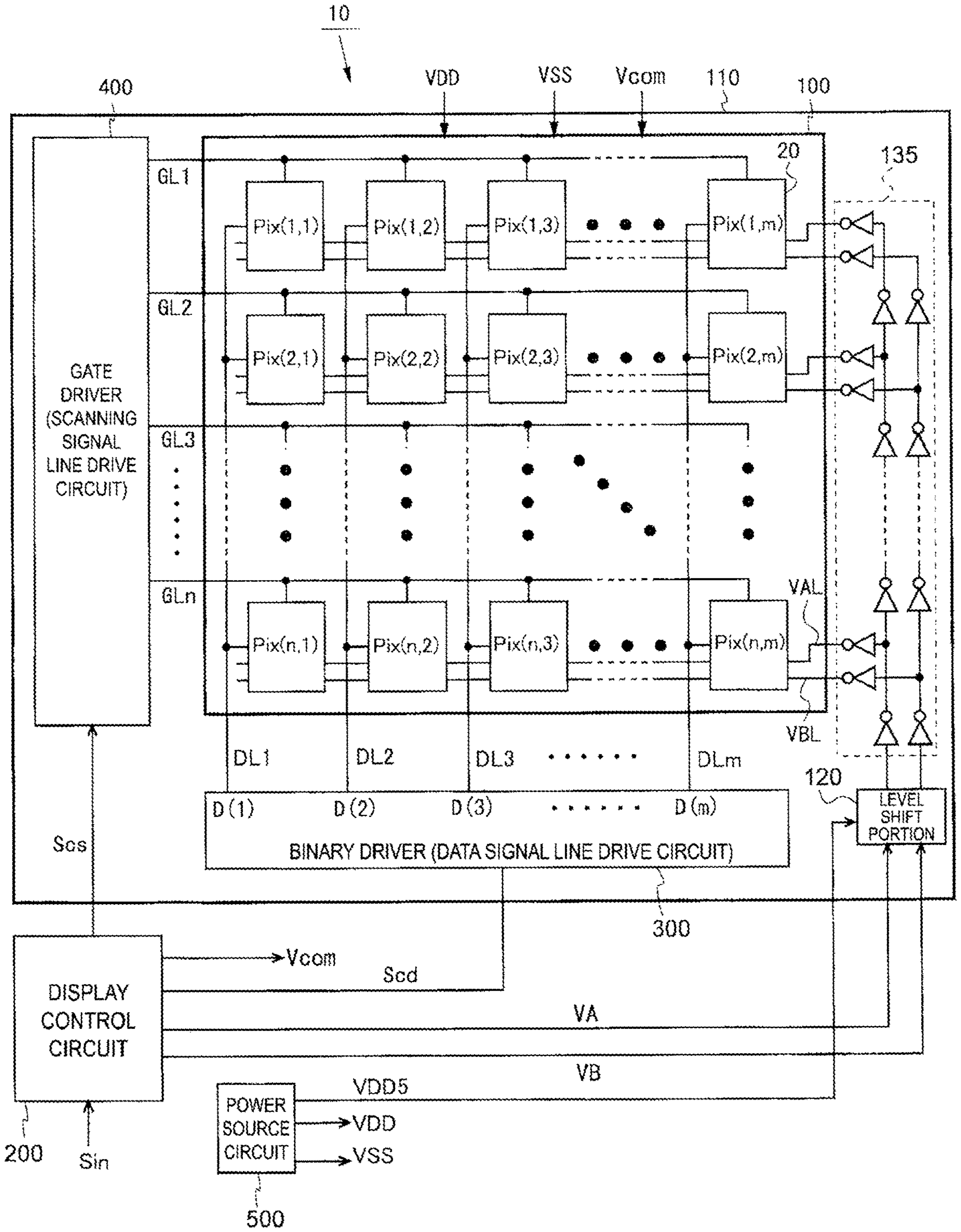
FIG. 15 is a block diagram illustrating a configuration of the pixel memory-type display device according to an eighth embodiment.

In contrast, in the pixel memory-type display device according to an eighth embodiment, a buffer portion 135, which is constituted by a plurality of inverters configured so as to sequentially delay the first selection control high voltage signal VAZ and the second selection control high voltage signal VBZ to be supplied to the plurality of (m×n) pixel circuits 20 arranged in the matrix pattern in the display portion 100 (hereinafter referred to as a "pixel matrix"), with respect to each of the m pixel circuits 20 constituting one row of the pixel matrix, is provided between the level shift portion 120 and the pixel matrix. As illustrated in FIG. 15, this buffer portion 135 is constituted by two delay chains each including a plurality of cascade-connected inverters for sequentially delaying the first selection control high voltage signal VAZ and the second selection control high voltage signal VBZ output from the level shift portion 120, and a plurality of tap inverters connected to the two delay chains. Due to the buffer portion 135 described above, the first selection control high voltage signal VAZ and the second selection control high voltage signal VBZ, which are sequentially delayed with respect to each of the m pixel circuits 20 constituting one row in the pixel circuit matrix, are supplied to the pixel matrix (m×n pixel circuits 20) in a dispersed manner. Specifically, the first selection control high voltage signal VAZ and the second selection control high voltage signal VBZ output from the level shift portion 120 are input to the corresponding delay chains, sequentially branched in those delay chains, and supplied to the first selection control line VAL and the second selection control line VBL arranged along the m pixel circuits 20 of the corresponding row, via the tap inverter corresponding to each of the rows of the pixel matrix.

According to such a configuration, when the first selection control high voltage signal VAZ and the second selection control high voltage signal VBZ are changed, peaks generated in the currents of the power source lines VDD5, VSS are sequentially shifted, and the voltage drop in the power source lines VDD5 and VSS is reduced. Therefore, according to the present embodiment, effects similar to those of the first embodiment can be obtained while preventing the problem caused by the large current flowing through the power source lines VDD5, VSS when the first selection control high voltage signal VAZ and the second selection control high voltage signal VBZ supplied to each of the pixel circuits 20 are changed.

Figure 16:
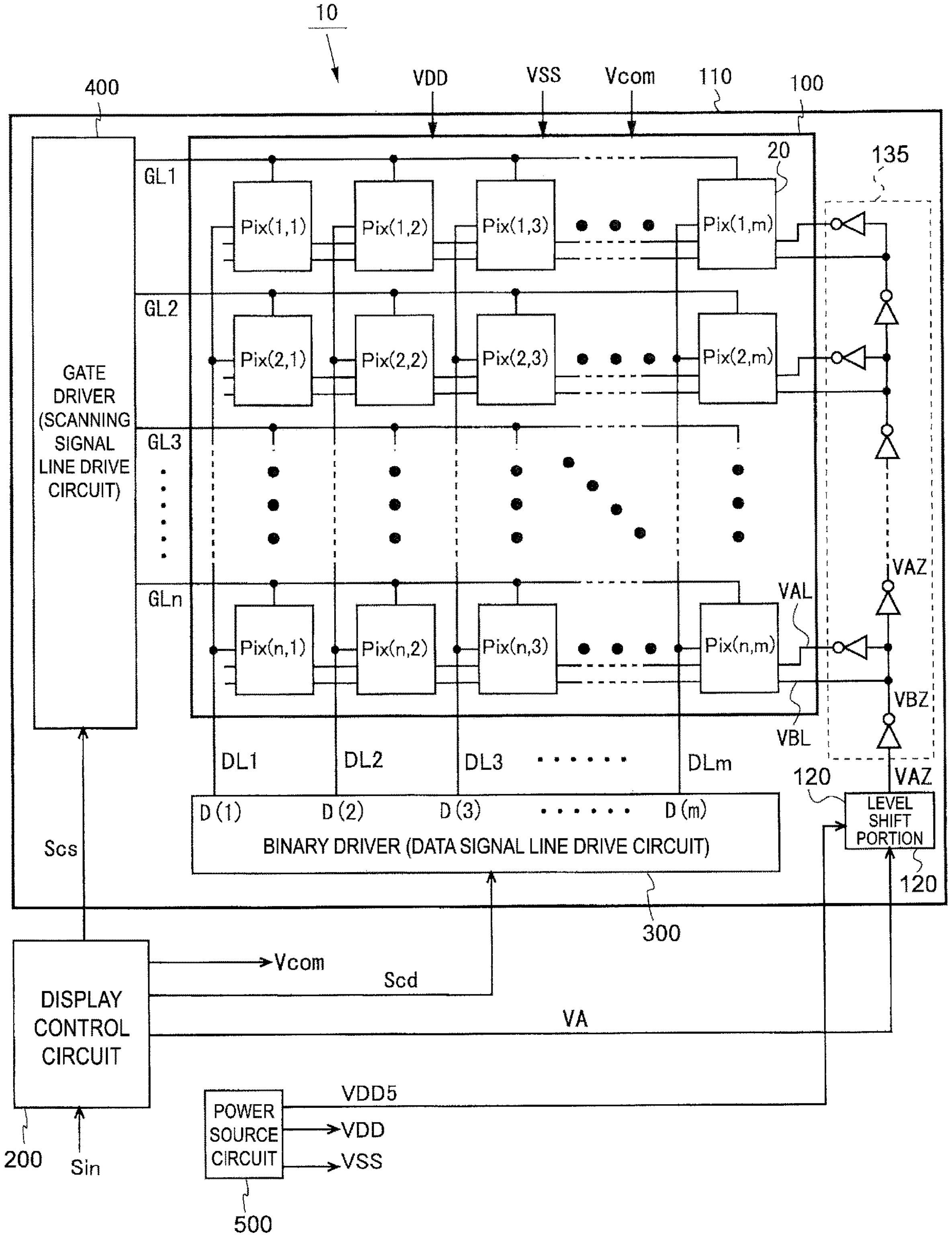
FIG. 16 is a block diagram illustrating a configuration of the pixel memory-type display device according to a modified example of the eighth embodiment.

Note that, in a similar manner as in the seventh embodiment, the level shift portion 120 according to the present embodiment includes the first level shifter 121 that outputs the first selection control high voltage signal VAZ, and the second level shifter 122 that outputs the second selection control high voltage signal VBZ (see FIG. 14). However, when it is not necessary to adjust the timings at which the first selection control signal VA and the second selection control signal VB change in a similar manner as in the third embodiment (see FIG. 9), the level shift portion 120 may be constituted by only the first level shifter 121, for example, and the second selection control high voltage signal VBZ may be generated by inverting the first selection control high voltage signal VAZ obtained by the first level shifter 121 using an inverter. In this case, for example, as a buffer portion for the first selection control high voltage signal VAZ, the buffer portion 135, in which one delay chain constituted by a plurality of cascade-connected inverters is connected to a plurality of tap inverters as illustrated in FIG. 16, may be provided in the display panel 110, and the second selection control high voltage signal VBZ may be generated, in the buffer portion 135, as an inverted signal of the first selection control high voltage signal VAZ.

In addition, the buffer portion 135, the first selection control line VAL, and the second selection control line VBL need not necessarily be configured such that the first selection control high voltage signal VAZ and the second selection control high voltage signal VBZ, which are sequentially delayed with respect to each of the m pixel circuits 20 constituting one row in the pixel circuit matrix, are supplied to the pixel matrix in the dispersed manner, but may be configured such that the first selection control high voltage signal VAZ and the second selection control high voltage signal VBZ, which are sequentially delayed with respect to each of pixel circuit groups constituted by a predetermined number of pixel circuits 20, are supplied to the pixel matrix (m×n pixel circuits 20) in the dispersed manner.

9. Modified Examples

The disclosure is not limited to the above-described embodiment described above, and various modifications may be made without departing from the scope of the disclosure.

For example, the configuration of the pixel memory circuit 21 in the pixel circuit 20 is not limited to the configuration illustrated in FIG. 5 or the configuration illustrated in FIG. 7. Although both the P-channel transistors and the N-channel transistors are included in the configurations illustrated in FIG. 5 and FIG. 7, the pixel memory circuit 21 may be constituted by only the P-channel transistors or only the N-channel transistors.

Although a liquid crystal display device is described above as an example of the embodiment, the disclosure is not limited to this example, and can be applied to any AC-driven pixel memory-type display device.

Note that the display device according to various modified examples can be configured in any combination so long as the characteristics of the display device according to the embodiments described above and the modified examples thereof are not adversely affected by the properties thereof.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A display device that performs binary display using a pixel circuit having a memory function, the display device comprising:

a plurality of pixel circuits configured to form an image to be displayed;

a first power source line and a second power source line;

a first selection control line and a second selection control line; and a selection control circuit configured to generate a first selection control signal and a second selection control signal to be applied to the first selection control line and the second selection control line, respectively, wherein each of the plurality of pixel circuits includes a display element including a pixel electrode and configured to be driven by a voltage for which a polarity is periodically inverted, a pixel memory circuit including a first node and a second node, the first node being configured to hold one of a voltage of the first power source line and a voltage of the second power source line in accordance with a pixel corresponding to the pixel circuit of the image to be displayed, and the second node being configured to hold, of the voltage of the first power source line and the voltage of the second power source line, the voltage that is different from the voltage held at the first node, and a voltage selection circuit configured to select a voltage to be applied to the pixel electrode from the voltage of the first node and the voltage of the second node, the voltage selection circuit includes a first selection transistor, as a switching element, including a first conduction terminal connected to the first node, a second conduction terminal connected to the pixel electrode, and a control terminal connected to the first selection control line, and a second selection transistor, as a switching element, including a first conduction terminal connected to the second node, a second conduction terminal connected to the pixel electrode, and a control terminal connected to the second selection control line, and the selection control circuit generates the first selection control signal and the second selection control signal to cause the first selection transistor and the second selection transistor to be turned on and off periodically in a mutually inverted manner.

2. The display device according to claim 1, wherein, in each of the plurality of pixel circuits, the selection control circuit generates the first selection control signal and the second selection control signal to cause a voltage turning on the first selection transistor to be applied to the first selection control line in order for the voltage of the first node to be supplied to the pixel electrode without being affected by a threshold voltage of the first selection transistor, when the voltage of the first node is selected by the voltage selection circuit, and generates the first selection control signal and the second selection control signal to cause a voltage turning on the second selection transistor to be applied to the second selection control line in order for the voltage of the second node to be supplied to the pixel electrode without being affected by a threshold voltage of the second selection transistor, when the voltage of the second node is selected by the voltage selection circuit.

3. The display device according to claim 2, wherein the first selection transistor and the second selection transistor are N-channel transistors, and the selection control circuit generates the first selection control signal and the second selection control signal to cause a voltage of the first selection control line to be higher, by at least the threshold voltage of the first selection transistor, than a higher voltage of the voltage of the first power source line and the voltage of the second power source line, when the first selection transistor is to be turned on, and generates the first selection control signal and the second selection control signal to cause a voltage of the second selection control line to be higher than the higher voltage by at least the threshold voltage of the second selection transistor, when the second selection transistor is to be turned on.

4. The display device according to claim 2, wherein the first selection transistor and the second selection transistor are P-channel transistors, and the selection control circuit generates the first selection control signal and the second selection control signal to cause a voltage of the first selection control line to be lower, by at least an absolute value of the threshold voltage of the first selection transistor, than a lower voltage of the voltage of the first power source line and the voltage of the second power source line, when the first selection transistor is to be turned on, and generates the first selection control signal and the second selection control signal to cause a voltage of the second selection control line to be lower than the lower voltage by at least an absolute value of the threshold voltage of the second selection transistor, when the second selection transistor is to be turned on.

5. The display device according to claim 1, wherein the selection control circuit generates the first selection control signal and the second selection control signal to cause the first selection transistor to change from an OFF state to an ON state when the second selection transistor is in the OFF state, and cause the second selection transistor to change from the OFF state to the ON state when the first selection transistor is in the OFF state.

6. The display device according to claim 1, further comprising:

a plurality of data signal lines;

a plurality of scanning signal lines;

a data signal line drive circuit configured to apply a plurality of data signals representing the image to be displayed to the plurality of data signal lines; and a scanning signal line drive circuit configured to selectively drive the plurality of scanning signal lines, wherein each of the plurality of pixel circuits corresponds to one of the plurality of data signal lines and corresponds to one of the plurality of scanning signal lines, and in each of the plurality of pixel circuits, of the voltage of the first power source line and the voltage of the second power source line, the pixel memory circuit holds, at the first node, a voltage corresponding to a voltage of a corresponding data signal line when a corresponding scanning signal line is selected, and holds, at the second node, the voltage, of the voltage of the first power source line and the voltage of the second power source line, that is different from the voltage held at the first node.

7. The display device according to claim 6, wherein the data signal line drive circuit and the scanning signal line drive circuit stop operating in a period in which a voltage level of one or both of the first selection control signal and the second selection control signal is switched.

8. The display device according to claim 6, further comprising:

a first power source circuit configured to generate a power source voltage to be supplied to the data signal line drive circuit and the scanning signal line drive circuit; and a second power source circuit provided as a separate power source circuit from the first power source circuit, and configured to generate a power source voltage to be supplied to the plurality of pixel circuits.

9. The display device according to claim 6, further comprising:

a power source circuit configured to generate a power source voltage to be supplied to the data signal line drive circuit, the scanning signal line drive circuit, and the plurality of pixel circuits; and a power supply line configured to supply the power source voltage generated by the power source circuit to the data signal line drive circuit, the scanning signal line drive circuit, and the plurality of pixel circuits, wherein the power supply line branches, in a vicinity of the power source circuit, into a power source line configured to supply the power source voltage to the data signal line drive circuit and the scanning signal line drive circuit, and a power source line configured to supply the power source voltage to the plurality of pixel circuits.

10. The display device according to claim 6, wherein each of the plurality of pixel circuits further includes a first conduction terminal connected to the corresponding data signal line, a second conduction terminal connected to the first node, and a write control transistor, as a switching element, including a control terminal connected to the corresponding scanning signal line.

11. The display device according to claim 1, wherein the first power source line is a high voltage side power source line, the second power source line is a low voltage side power source line, and the pixel memory circuit includes a first P-channel transistor including a source terminal connected to the first power source line, a drain terminal connected to the second node, and a gate terminal connected to the first node, a first N-channel transistor including a source terminal connected to the second power source line, a drain terminal connected to the second node, and a gate terminal connected to the first node, a second P-channel transistor including a source terminal connected to the first power source line, a drain terminal connected to the first node, and a gate terminal connected to the second node, and a second N-channel transistor including a source terminal connected to the second power source line, a drain terminal connected to the first node, and a gate terminal connected to the second node.

12. The display device according to claim 1, further comprising a level shift portion, wherein the selection control circuit generates the first selection control signal and the second selection control signal based on the voltage of the first power source line and the voltage of the second power source line, in each of the plurality of pixel circuits, the level shift portion converts a voltage level of the first selection control signal to cause a voltage turning on the first selection transistor to be applied to the first selection control line in order for the voltage of the first node to be supplied to the pixel electrode without being affected by a threshold voltage of the first selection transistor, when the voltage of the first node is selected by the voltage selection circuit, and the level shift portion converts a voltage level of the second selection control signal to cause a voltage turning on the second selection transistor to be applied to the second selection control line in order for the voltage of the second node to be supplied to the pixel electrode without being affected by a threshold voltage of the second selection transistor, when the voltage of the second node is selected by the voltage selection circuit, and the first selection control signal and the second selection control signal having had the voltage level converted by the level shift portion are applied to the first selection control line and the second selection control line, respectively.

13. The display device according to claim 12, further comprising a buffer portion including a plurality of buffers configured to sequentially delay the first selection control signal and the second selection control signal having had the voltage level converted by the level shift portion, wherein the first selection control line and the second selection control line are configured to supply, to the plurality of pixel circuits and in a dispersed manner, the first selection control signal and the second selection control signal having been sequentially delayed by the buffer portion.

14. The display device according to claim 1, further comprising a common electrode drive circuit, wherein the display element further includes a common electrode provided in common to the plurality of pixel circuits, and the common electrode drive circuit is configured to drive the common electrode to cause a polarity of a voltage applied between the pixel electrode and the common electrode to be periodically inverted in each of the plurality of pixel circuits.

15. The display device according to claim 14, wherein the display element is a liquid crystal display element including a liquid crystal interposed between the pixel electrode and the common electrode.

16. A driving method of a display device that performs binary display using a pixel circuit having a memory function, the display device including a plurality of pixel circuits configured to form an image to be displayed, a first power source line and a second power source line, and a first selection control line and a second selection control line, each of the plurality of pixel circuits including a display element including a pixel electrode and configured to be driven by a voltage for which a polarity is periodically inverted, a pixel memory circuit including a first node and a second node, the first node being configured to hold one of a voltage of the first power source line and a voltage of the second power source line in accordance with a pixel corresponding to the pixel circuit of the image to be displayed, and the second node being configured to hold, of the voltage of the first power source line and the voltage of the second power source line, the voltage that is different from the voltage held at the first node, and a voltage selection circuit configured to select a voltage to be applied to the pixel electrode from the voltage of the first node and the voltage of the second node, the voltage selection circuit including a first selection transistor, as a switching element, including a first conduction terminal connected to the first node, a second conduction terminal connected to the pixel electrode, and a control terminal connected to the first selection control line, and a second selection transistor, as a switching element, including a first conduction terminal connected to the second node, a second conduction terminal connected to the pixel electrode, and a control terminal connected to the second selection control line, the driving method comprising:

holding, in the pixel memory circuit in each of the plurality of pixel circuits, one of the voltage of the first power source line and the voltage of the second power source line at the first node in accordance with the pixel corresponding to the pixel circuit of the image to be displayed, and holding, at the second node, the voltage, of the voltage of the first power source line and the voltage of the second power source line, that is different from the voltage at the first node; and alternately selecting, in the voltage selection circuit in each of the plurality of pixel circuits, the voltage to be applied to the pixel electrode in the pixel circuit from the voltage of the first node and the voltage of the second node by periodically turning on and off the first selection transistor and the second selection transistor in a mutually inverted manner using a voltage of the first selection control line and a voltage of the second selection control line, wherein the alternately selecting of the voltage includes applying, when the voltage of the first node is selected, a voltage turning on the first selection transistor to the first selection control line to cause the voltage of the first node to be applied to the pixel electrode without being affected by a threshold voltage of the first selection transistor and applying, when the voltage of the second node is selected, a voltage turning on the second selection transistor to the second selection control line to cause the voltage of the second node to be applied to the pixel electrode without being affected by a threshold voltage of the second selection transistor.

* * * * *